United States Patent
Akanuma

(10) Patent No.: US 7,489,600 B2
(45) Date of Patent: Feb. 10, 2009

(54) OBJECT LENS DRIVING DEVICE WITH REDUCED TILT DURING FOCUSING AND TRACKING OPERATIONS AND OPTICAL PICKUP AND OPTICAL DISK DRIVE UTILIZING THE SAME

(75) Inventor: Goichi Akanuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 571 days.

(21) Appl. No.: 11/064,021

(22) Filed: Feb. 23, 2005

(65) Prior Publication Data

US 2005/0185530 A1    Aug. 25, 2005

(30) Foreign Application Priority Data

Feb. 25, 2004  (JP) .............................. 2004-049923

(51) Int. Cl.
*G11B 7/00* (2006.01)
(52) U.S. Cl. ................................ 369/44.11; 369/44.15
(58) Field of Classification Search ................. 359/813, 359/814, 823; 369/44.11, 44.15, 44.16, 44.21, 369/44.22; 720/681, 683
See application file for complete search history.

(56) References Cited

U.S. PATENT DOCUMENTS

| | | | | |
|---|---|---|---|---|
| 4,811,320 A | * | 3/1989 | Kawasaki et al. | 369/44.15 |
| 5,414,680 A | * | 5/1995 | Ikegame | 369/44.14 |
| 6,163,416 A | * | 12/2000 | Uekusa et al. | 359/813 |
| 6,285,517 B1 | * | 9/2001 | Uekusa et al. | 359/813 |
| 6,344,936 B1 | * | 2/2002 | Santo et al. | 359/824 |
| 6,570,720 B2 | * | 5/2003 | Kawano | 359/813 |
| 6,625,105 B2 | * | 9/2003 | Suzuki et al. | 720/681 |
| 6,683,831 B2 | * | 1/2004 | Tanaka et al. | 369/44.14 |
| 6,791,772 B2 | * | 9/2004 | Wakabayashi et al. | 359/824 |
| 6,801,483 B2 | * | 10/2004 | Hong et al. | 369/44.15 |
| 7,102,966 B2 | * | 9/2006 | Tanaka | 369/44.16 |
| 2001/0026528 A1 | | 10/2001 | Suzuki et al. | |
| 2002/0071376 A1 | * | 6/2002 | Kimura et al. | 369/112.23 |
| 2003/0012090 A1 | * | 1/2003 | Kawano | 369/44.16 |
| 2003/0016597 A1 | * | 1/2003 | Haruguchi et al. | 369/44.16 |
| 2003/0021219 A1 | * | 1/2003 | Nagai | 369/244 |

FOREIGN PATENT DOCUMENTS

| | | |
|---|---|---|
| JP | 05-114152 A | 5/1993 |
| JP | 2001-222830 A | 8/2001 |
| JP | 2003-91844 | 3/2003 |
| JP | 2004-265514 A | 9/2004 |

* cited by examiner

*Primary Examiner*—Hoa T Nguyen
*Assistant Examiner*—Mark Fischer
(74) *Attorney, Agent, or Firm*—Dickstein Shapiro LLP

(57) ABSTRACT

An object lens driving device with reduced tilt even when focusing and tracking operations are performed simultaneously. The object lens driving device includes a movable unit with an object lens and an object lens holding member lens, elastic supporting rods arranged on two sides of the movable unit in a tangential direction and supporting the movable unit while allowing the movable unit to move relative to a fixed unit in a focusing direction and a tracking direction, and a driving unit that includes a focusing thrust force generation unit and a tracking thrust force generation unit. The force generation units generate a moment which acts to cancel out a tilt of the movable unit occurring in a supporting system when the movable unit moves in the focusing direction and the tracking direction.

11 Claims, 22 Drawing Sheets

FOCUSING DIRECTION
TRACKING DIRECTION

FOCUSING DIRECTION
TRACKING DIRECTION

FOCUSING DIRECTION

TRACKING DIRECTION

FOCUSING DIRECTION

TRACKING DIRECTION

FOCUSING DIRECTION

TRACKING DIRECTION

MOVABLE UNIT

SUPPORTING CENTER

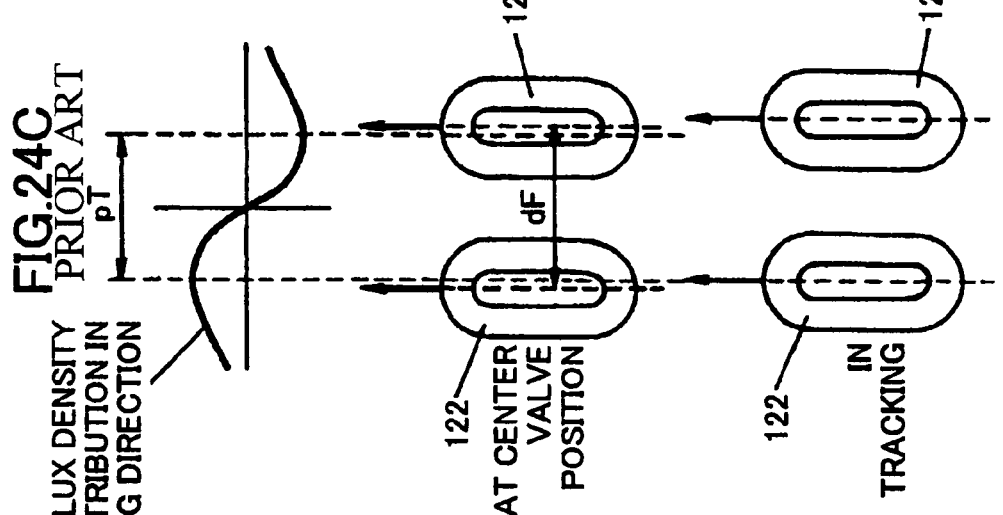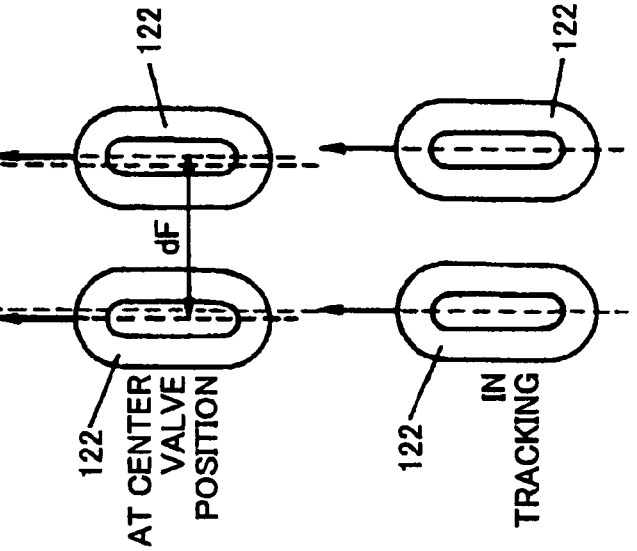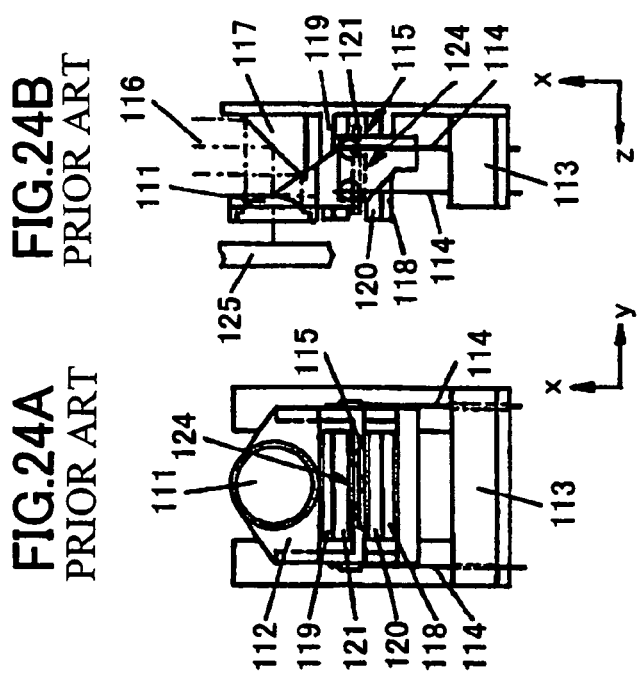

OBJECT LENS DRIVING DEVICE WITH REDUCED TILT DURING FOCUSING AND TRACKING OPERATIONS AND OPTICAL PICKUP AND OPTICAL DISK DRIVE UTILIZING THE SAME

BACKGROUND OF THE INVENTION

1. Field of the Invention

The present invention relates to a driving device of an object lens in an optical disk drive or a magneto-optic disk drive, an optical pickup, and an optical disk drive.

2. Description of the Related Art

In an optical disk drive, a laser beam is emitted onto an optical disk, which acts as a recording medium, and information recorded in the optical disk is extracted from light reflected by the optical disk. An object lens driving device installed in the optical disk drive controls the object lens so that the object lens follows up wobble or eccentricity of the recording medium so as to drive the object lens in a focusing direction and a tracking direction and form a light spot on a recording surface of the recording medium.

When dealing with data of a large size, it is desirable that recording and reproduction be carried out at high speed, and for this purpose, it is necessary to drive the recording medium to rotate at high speed. However, when driving a recording medium having wobble or eccentricity to rotate at high speed, because the acceleration of the recording medium increases, and in order to ensure that the object lens to follows the recording medium precisely, it is necessary to use an object lens driving device able to generate a large thrust force.

On the other hand, in recent years and continuing, in order to further increase the recording density of the optical disk, it is necessary to form a small light spot on the recording medium. For this purpose, it is suggested to the increase NA (Numerical Aperture) of the object lens or decrease the wavelength of the incident laser light. When the NA of the object lens is increased or the wavelength of the incident laser light is decreased, however, the optical axis of the object lens turns out to deviate from the normal direction of the recording medium, and this may induce chromatic aberration easily. Due to this, the quality of the light spot may degrade, and the recording and reproduction quality may decline. Therefore, it is required to improve the accuracy of tilts of the recording medium and the object lens in order to increase the recording density.

Specifically, if the object lens driving device drives operations of the object lens only in the focusing direction and the tracking direction, which is the so-called "two-axis object lens driving device", it is necessary to reduce the tilts of the object lens during focusing and tracking operations.

In recent years and continuing, higher precision is required, and an optical disk drive has been proposed that is able to positively correct the tilts of the recording medium and the object lens.

There are several methods of correcting the tilts of the recording medium and the object lens. Particularly, an object lens driving device has been proposed which carries out tilt driving by rendering a movable unit of the object lens driving device to follow up the tilt of the recording medium. The object lens is included in the movable unit. This object lens driving device has a low cost and a small size, hence occupying only a small space. In addition, since the movable unit is light-weight, it can follow up the tilt of a high-speed rotating recording medium.

However, even for such an object lens driving device capable of tilt driving, if the tilts arising in focusing and tracking operations are large, servo-control in the device is liable to be out of phase. Hence, it is required to reduce the tilts arising in the focusing and tracking operations.

Below, a description is made of an example of the object lens driving device of the related art.

FIG. 23 is a cross-sectional view illustrating a schematic configuration of a two-axis object lens driving device as a first example of the related art.

As illustrated in FIG. 23, in a two-axis object lens driving device 100, a movable unit 102 which includes an object lens 101 is supported at one side by four rod-like elastic supporting members 104 in the tangential direction on a fixed portion 103.

The two-axis object lens driving device 100 has a focus driving coil 105, which is a cylindrical coil with a focusing direction to be a winding axis. The magnetic flux of a magnet 107 penetrates, in the tangential direction, a portion of the focus driving coil 105 in which an electric current flows in the tracking direction.

The two-axis object lens driving device 100 further has two tracking coils 106, each of which is a planar coil with the tangential direction to be a winding axis. The two tracking coils 106 are arranged in a line in the tracking direction. Similarly, the magnetic flux of the magnet 107 penetrates a side of each of the tracking coils 106, in which an electric current flows in the focusing direction.

When electric currents flow in the respective driving coils, the two-axis object lens driving device 100 drives the object lens so as to perform focusing and tracking operations.

In this example, when offsets are provided in the focusing direction and the tracking direction, because of a density distribution of the magnetic flux of the magnet 107, the position of the center of a thrust force along the focusing direction deviates from its normal position.

FIGS. 24A through 24C are cross-sectional views showing a schematic configuration of a two-axis object lens driving device as a second example of the related art.

As illustrated in FIGS. 24A through 24C, an object lens holding member 112 for holding an object lens 111 is elastically supported by four rod-like elastic supporting members, such as four wire springs 114, which extend from a stem 113. An object lens 111 is fixed at an end of the object lens holding member 112. In addition, a driving coil assembly 115 is stacked and fixed on the object lens holding member 112, being positioned beside the object lens 111. A prism 117 is mounted on a plate member which is integrated with the stem 113.

Next, with appropriate spaces being provided in the axial direction of the wire springs 114 of the object lens holding member 112, two sets of yokes 118, 119 and driving magnets 120, 121 are mounted on a plate member integrated with the stem 113 to face each of the driving coil assemblies 115. Each of the driving magnets 120, 121 is square-shaped and is divided into four divisions along cross-shaped magnetization boundaries for magnetization. The direction of magnetization is perpendicular to a plane including the focusing direction and the tracking direction, and the magnetization directions of adjacent divisions are opposite to each other.

Each of the driving coil assemblies 115 is constituted by a combination of two focus driving coils 122 and two tracking driving coils 123. The two focus driving coils 122 each including a planar coil are provided on two sides of the magnetization boundary in the focusing direction of the driving magnets 120, 121. On the other hand, the two tracking driving coils 123 each including a planar coil are provided on two sides of the magnetization boundaries in the tracking direction of the driving magnets 120, 121. The two tracking driving coils 123 are mounted on the object lens holding member 112 across the magnetization boundaries in the focusing direction. The driving magnets 120, 121 are provided to sandwich the focus driving coils 122 and the tracking driving coils 123 with respective portions of the driving magnets 120, 121 facing each other having the same magnetization direction. In this way, the focus driving coils 122, the tracking driving coils 123, and the driving magnets 120, 121 constitute a driving motor 124.

In the second example of a two-axis object lens driving device in the related art, a movable unit which includes an object lens is supported at one side by rod-like elastic supporting members in a tangential direction on a fixed portion.

In this structure, in order to reduce the moment generated by the focusing coils, centers of the driving coils are set to be approximately in agreement with centers of the corresponding magnetic flux density distributions, or intervals of the centers of the driving coils are set to be more or less greater than intervals of the centers of the magnetic flux density distributions. With such settings, the moment generated by the focusing coils are reduced, and tilts arising in the focusing and tracking operations are reduced.

FIG. 25 is a perspective view illustrating a schematic configuration of an object lens driving device as a third example of the related art.

FIG. 26 is a perspective view illustrating a configuration of a driving motor in the object lens driving device in FIG. 25.

Illustrated in FIG. 25 and FIG. 26 are an object lens 131, an object lens holding member 132, focus driving coils 133, a track driving coil 134, wire springs 135, fixed members 136, a base 137, driving magnets 138, elastic substrate 139, and a radial (rotational) tilt coil 140.

The object lens driving device illustrated in FIG. 25 and FIG. 26 is a four-axis object lens driving device, which is able to tilt the object lens 131 in response to angular deviations of the object lens 131 and a recording medium.

In the object lens driving devices illustrated in FIG. 23 and FIGS. 24A through 24C, which utilize four wire springs arranged in parallel, the supporting rigidity in the tangential tilt direction ends up increasing greatly. In contrast, in the object lens driving devices illustrated in FIG. 25 and FIG. 26, eight rod-like elastic supporting members are arranged in the same plane. Due to this, a tension and compression stress along the axial direction of rod-like elastic supporting member does not appear during operations in the tangential direction. By such a structure, similar moving properties can be obtained in the tangential tilt direction and in the radial tilt direction.

For example, Japanese Laid-Open Patent Application No. 2003-91844 discloses a technique in the related field.

In the third example, a movable unit, which includes the object lens holding member 132, the focus driving coils 133, the track driving coil 134, and so on, is supported from two sides in the tangential directions. Due to this, moments generated when driving focusing operations are cancelled out on the two sides, and thus, the tangential tilt does not take place, theoretically.

On the other hand, when performing focusing and tracking at the same time, there arises a problem in that radial tilt (rotation) may take place. Specifically, when driving in the focus+direction and the track+direction, the movable unit tilts in the radial direction. Furthermore, the magnitude of the radial tilt changes along with changes of magnitudes and directions of the focusing driving operation and the tracking driving operation.

FIG. 27 presents typical tilts arising in the supporting system in the object lens driving device shown in FIG. 25.

Tilts shown in FIG. 27 are caused by deviation of a supporting center from the center of the movable unit during focusing movement and tracking movement.

FIGS. 28A and 28B are views for showing the reason of the tilts arising in the supporting system in the object lens driving device shown in FIG. 25.

In FIGS. 28A and 28B, from the time when the movable unit is at a center valve position (FIG. 28A), the focusing movement at the time of movement for focusing and tracking (FIG. 28B) is taken as an action radius and moment generated by a tracking driving force. With such relationships, the reasons of the tilts in FIG. 27 can be easily understood.

FIGS. 28A and 28B illustrate driving in the focus+direction and the tracking+direction, and the movable unit tilts in the radial direction.

The tilts shown in FIG. 27 are not as large as those in the object lens driving devices in FIG. 23 and FIGS. 24A through 24C, in which a movable unit is supported at one side in the tangential direction. However, in recent years and continuing, in order to meet the requirements of higher precision, it becomes necessary to reduce tilts arising in focusing and tracking operations.

SUMMARY OF THE INVENTION

It is a general object of the present invention to solve one or more problems of the related art.

A specific object of the present invention is to provide an object lens driving device able to reduce tilts arising in a supporting system therein during focusing and tracking operations, and an optical pickup and an optical disk drive.

According to a first aspect of the present invention, there is provided an object lens driving device, comprising: a movable unit that includes an object lens and an object lens holding member for holding the object lens; a plurality of elastic supporting rods that are arranged on two sides of the movable unit in a tangential direction to support the movable unit while allowing the movable unit to move relative to a fixed unit in a focusing direction and a tracking direction, the focusing direction being in an optical axial direction of the object lens, the tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction, wherein each of the focusing thrust force generation unit and the tracking thrust force generation unit includes a driving magnet and a driving coil arranged to face the driving magnet; and a moment is generated so as to cancel out a tilt of the movable unit caused by a change of a supporting center of the movable unit when the driving coil is fed to move the movable unit in the focusing direction and the tracking direction.

According to the above invention, a tilt of the movable unit caused by a supporting system is cancelled out when the driving coil is fed to move the movable unit in the focusing direction and the tracking direction, and the overall tilt can be reduced.

As an embodiment, at a focusing position when each of the elastic supporting rods is not bent, a center of the driving coil in the focusing direction is substantially in agreement with a center of the driving magnet in the focusing direction.

According to the above invention, the center of the supporting system is adjusted to be roughly in agreement with the center position of the motor when the tilt takes place, hence the tilt can be reliably cancelled out.

As an embodiment, a plurality of the focusing thrust force generation units are arranged in the tracking direction; and an interval between centers of the driving coils of adjacent focusing thrust force generation units is less than an interval of centers of magnetic flux density distributions of the driving magnets respectively corresponding to the focusing thrust force generation units.

According to the above invention, with a motor having plural focusing thrust force generation units arranged in the tracking direction, the tilt caused by a supporting system is cancelled out, and the overall tilt can be reduced.

As an embodiment, a plurality of the focusing thrust force generation units are arranged in the tracking direction, and a moment is induced by differences of magnitudes of driving forces of the focusing thrust force generation units in the focusing direction occurring when the movable unit moves in the focusing direction and the tracking direction, the moment canceling out a tilt of the movable unit caused by a supporting system of the movable unit including the elastic supporting rods.

According to the above invention, with a motor having plural focusing thrust force generation units arranged in the tracking direction, the tilt caused by the supporting system is cancelled out, and the overall tilt can be reduced.

As an embodiment, plural tracking thrust force generation units are arranged in the focusing direction; and an interval of the driving coils of the tracking thrust force generation units is greater than an interval of centers of magnetic flux density distributions of the driving magnets respectively corresponding to the tracking thrust force generation units.

According to the above invention, with a motor having plural tracking thrust force generation units arranged in the focusing direction, the tilt caused by the supporting system is cancelled out, and the overall tilt can be reduced.

As an embodiment, plural tracking thrust force generation units are arranged in the focusing direction; and a moment is induced by differences of magnitudes of driving forces of the tracking thrust force generation units in the tracking direction occurring when the movable unit moves in the focusing direction and the tracking direction, the moment canceling out a tilt of the movable unit caused by a supporting system of the movable unit including the elastic supporting rods.

According to the above invention, with a motor having plural tracking thrust force generation units arranged in the focusing direction, the tilt caused by the supporting system is cancelled out, and the overall tilt can be reduced.

As an embodiment, the driving magnet includes a double-pole magnet having a magnetization boundary in the tracking direction; the driving coil of the focusing thrust force generation unit includes a planar coil arranged across the magnetization boundary and facing the double-pole magnet; and a moment is induced by a difference of the magnitude of a driving force in the tracking direction generated at a portion of the driving coil wherein a current flows in the focusing direction when the movable unit moves in the focusing direction and the tracking direction, the moment canceling out a tilt of the movable unit caused by a supporting system of the movable unit including the elastic supporting rods.

According to the above invention, with a motor having a double-pole magnet and a planar focus coil, the tilt caused by the supporting system is cancelled out, and the overall tilt can be reduced.

As an embodiment, the driving coil of the tracking thrust force generation unit is arranged so that magnetic flux in the tangential direction penetrates an effective portion of the driving coil wherein a current flows in the focusing direction; and a moment is induced by a change of the magnetic flux penetrating the effective portion of the driving coil when the movable unit moves in the tracking direction, the moment canceling out a tilt of the movable unit caused by a supporting system of the movable unit including the elastic supporting rods.

According to the above invention, by utilizing the driving force generated at an effective portion of the focusing driving coil, the tilt caused by the supporting system is cancelled out, and the overall tilt can be reduced.

As an embodiment, the driving coil of the tracking thrust force generation unit includes two substantially square coils; the driving coil of the tracking thrust force generation unit is arranged so that magnetic flux in the tangential direction penetrates the inner sides of the square coils, said inner sides being parallel to respective focusing directions of the square coils; a length of a portion of the driving coil wherein a current flows in the tracking direction is set to be greater than a side of the driving coil parallel to the focusing direction thereof; the driving coil of the tracking thrust force generation unit is arranged so that magnetic flux in the tangential direction penetrates an effective portion of the driving coil wherein a current flows in the focusing direction; a moment is induced by a thrust force in the focusing direction generated at a portion of the driving coil wherein a current flows in the tracking direction when the movable unit moves in the focusing direction and in the tracking direction, said moment canceling out a tilt of the movable unit caused by a supporting system of the movable unit including the elastic supporting rods.

According to the above invention, by utilizing the driving force generated by two substantially square tracking driving coils arranged in the tracking direction, the tilt caused by the supporting system is cancelled out, and the overall tilt can be reduced.

According to a second aspect of the present invention, there is provided an object lens driving device, comprising: a movable unit that includes an object lens and an object lens holding member for holding the object lens; plural elastic supporting rods that are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction, wherein a moment M approximately expressed by formula (1) is generated by the focusing thrust force generation unit and the tracking thrust force generation unit near axes perpendicular to the focusing direction and the tracking direction, respectively.

$$M = \alpha * Xfo * Xtr * k\theta / (kfo * ktr) \quad (1)$$

where $\alpha$ is a coefficient, Xfo represents the magnitude of a focusing movement, Xtr represents the magnitude of a tracking movement, $k\theta$ represents a tilt spring constant, kfo represents a spring constant in the focusing direction, and ktr represents a spring constant in the tracking direction.

According to the above invention, by generating a moment corresponding to the tilt caused by the supporting system, the tilt can be reliably cancelled out.

According to a third aspect of the present invention, there is provided an optical pickup comprising a laser unit that emits a laser beam onto an optical disk; a light-receiving optical system that receives light reflected from the optical disk; an object lens controller that outputs a control signal based on a signal corresponding to the light received in the light-receiving optical system; and an object lens driving device. The object lens driving device includes a movable unit that includes an object lens and an object lens holding member for holding the object lens; a plurality of elastic supporting rods that are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction. Each of the focusing thrust force generation unit and the tracking thrust force generation unit includes a driving magnet and a driving coil arranged to face the driving magnet; and a moment is generated so as to cancel out a tilt of the movable unit caused by a change of a supporting center of the movable unit when the driving coil is fed to move the movable unit in the focusing direction and the tracking direction.

According to the above invention, by using an object lens driving device superior in tilt characteristics, it is possible to provide an optical pickup able to obtain signals of high quality.

According to a fourth aspect of the present invention, there is provided an optical disk drive, comprising: a rotational driving system that drives an optical disk to rotate; and an optical pickup that is provided to be able to move in a radial direction of the optical disk. The optical pickup includes a laser unit that emits a laser beam onto an optical disk; a light-receiving optical system that receives light reflected from the optical disk; an object lens controller that outputs a control signal based on a signal corresponding to the light received in the light-receiving optical system; and an object lens driving device. The object lens driving device includes: a movable unit that includes an object lens and an object lens holding member for holding the object lens; a plurality of elastic supporting rods that are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction, wherein each of the focusing thrust force generation unit and the tracking thrust force generation unit includes a driving magnet and a driving coil arranged to face the driving magnet; and a moment is generated so as to cancel out a tilt of the movable unit caused by a change of a supporting center of the movable unit when the driving coil is fed to move the movable unit in the focusing direction and the tracking direction.

According to the above invention, by using an object lens driving device superior in tilt characteristics, it is possible to provide an optical disk drive able to read and write data under good conditions.

These and other objects, features, and advantages of the present invention will become more apparent from the following detailed description of preferred embodiments given with reference to the accompanying drawings.

BRIEF DESCRIPTION OF THE DRAWINGS

FIGS. 24A through 24C are cross-sectional views showing a schematic configuration of a two-axis object lens driving device as a second example of the related art;

DESCRIPTION OF THE PREFERRED EMBODIMENTS

Below, preferred embodiments of the present invention are explained with reference to the accompanying drawings.

First Embodiment

Figure 1:
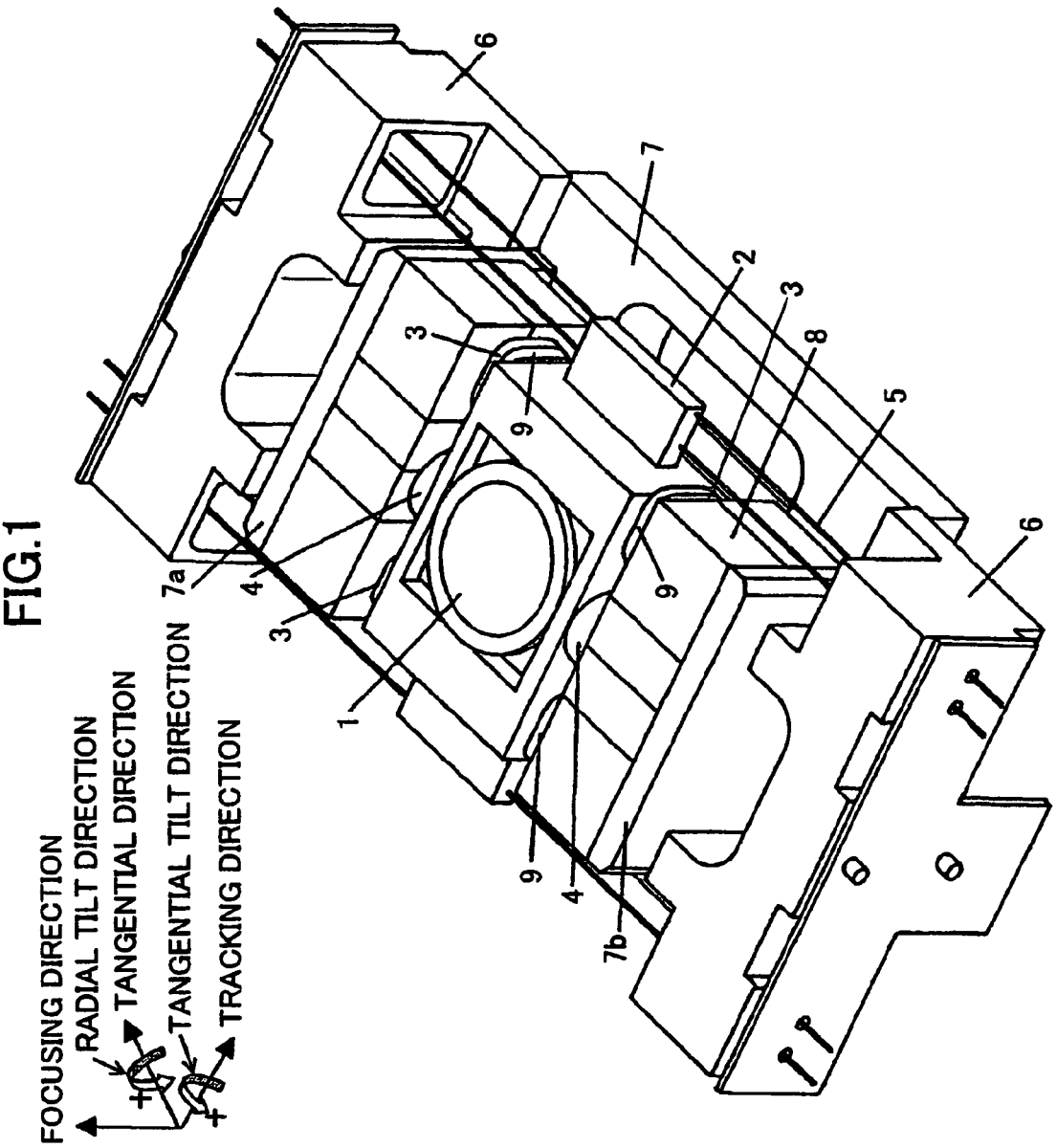
FIG. 1 is a perspective view illustrating an object lens driving device according to a first embodiment of the present invention.

FIG. 1 is a perspective view illustrating an object lens driving device according to a first embodiment of the present invention.

The structure shown in FIG. 1 includes an object lens 1, an object lens holding member 2, focus driving coils (abbreviated to be "Fo coil" hereinafter) 3, a track driving coil (abbreviated to be "Tr coil" hereinafter) 4, wire springs 5, fixed members 6, a base 7, driving magnets 8, and a radial tilt driving coil 9.

A hole is formed at the center of the base 7, and on two sides of the hole, walls 7a, 7b are formed to face each other. On the side surfaces of the base 7, two fixed members 6 are provided to sandwich the walls 7a, 7b. Two driving magnets 8 are attached to the walls 7a, 7b, respectively. Between the two driving magnets 8, the object lens holding member 2 is arranged to hold the object lens 1.

The object lens holding member 2 is nearly a rectangle having a hole at the center, and the object lens 1 is mounted on the hole. The object lens holding member 2 is elastically supported by the wire springs 5 relative to the fixed members 6.

The wire springs 5 are arranged with the longitudinal direction thereof in the tangential direction of the object lens holding member 2 and in the same plane perpendicular to the focusing direction approximately parallel to each other.

The fixed members 6 are fixed to two sets of two wire springs 5 on the corresponding two sides along the tracking direction.

The object lens holding member 2 is supported by a total of eight wire springs 5 extending from the fixed members 6 on the two sides along the tangential direction.

A pair of Fo coils 3 and a pair of radial tilt driving coils 9 are attached to each of the two side surfaces along the tangential direction of the object lens holding member 2, and the radial tilt driving coils 9 overlap on the Fo coils 3. The Fo coils 3 and the radial tilt driving coils 9 are arranged to face the driving magnets 8. The radial tilt driving coils 9 have four turns. In addition, each of the two Fo coils 3 attached to the two side surfaces along the tangential direction of the object lens holding member 2 has two turns.

Below, for convenience of explanation, the structure including the object lens holding member 2 with the object lens 1, the Fo coils 3, and the Tr coils 4 being mounted is referred to as a "movable unit", the group of coils including the Fo coils 3, the Tr coils 4, and the radial tilt driving coils 9 is collectively referred to as "driving coils", and the portion including the driving coils and the driving magnets 8 is referred to as a "driving motor".

By separately driving the Fo coils 3 attached to the two side surfaces along the tangential direction of the object lens holding member 2, due to a difference of the thrust forces on the two sides, the object lens holding member 2 can be moved in the tangential direction to be tilted.

In addition, by conducting an electrical current in the radial tilt driving coils 9 arranged in the tracking direction in a line, the radial tilt driving coils 9 generate repulsive forces in the focusing direction opposite to each other, and this induces a moment in the radial tilt direction, thereby, the movable unit can be tilted in the radial direction (rotated).

Figure 2:
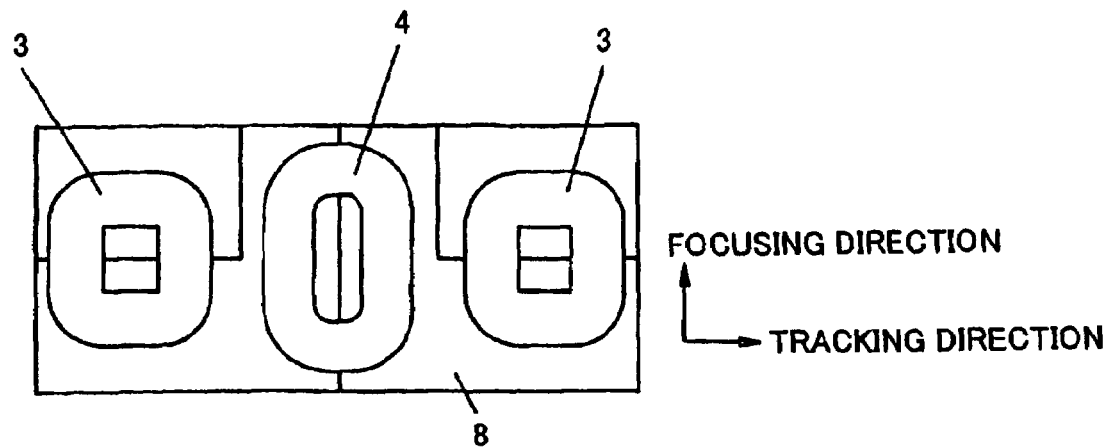
FIG. 2 is a plan view illustrating a structure of the driving motor in the object lens driving device in FIG. 1.

FIG. 2 is a plan view illustrating a structure of the driving motor in the object lens driving device in FIG. 1.

As illustrated in FIG. 2, the driving magnet 8 has four magnetization regions, which are defined by a boundary line passing through the center of the driving magnet 8 and parallel to the focusing direction, and two L-shaped boundary lines on the upper-left and upper-right portions of the driving magnet 8. Neighboring magnetization regions have magnetic poles opposite to each other. Further, the four regions are arranged to be symmetric relative to the boundary line through the center and parallel to the focusing direction.

On the two side surfaces along the tangential direction of the object lens holding member 2, the Fo coils 3 and the radial tilt driving coils 9 are mounted along the tracking direction as a row, and the Tr coil 4 is mounted between the Fo coils 3. In addition, when the driving coils are placed to face the driving magnets 8, the track driving coil 4 opposes the central boundary line parallel to the focusing direction, and the Fo coils 3 oppose the boundary lines parallel to the tracking direction on the two sides, respectively.

Figure 3:
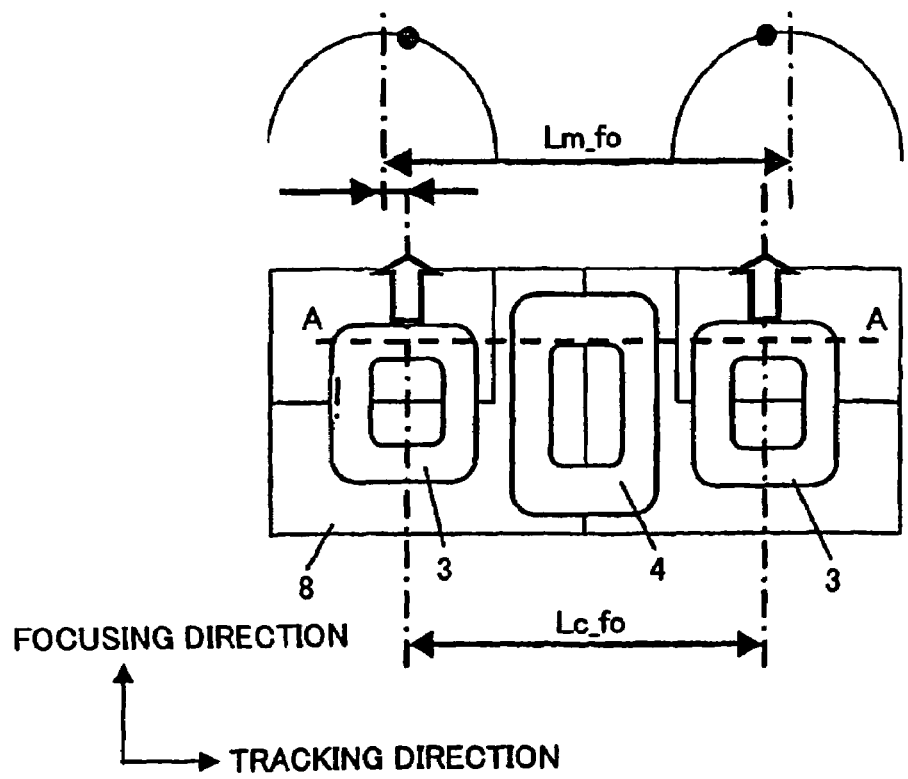
FIG. 3 is a plan view illustrating driving forces generated by the focusing driving coils 3 when the movable unit is at a center valve position.

FIG. 3 is a plan view illustrating driving forces generated by the focusing driving coils 3 when the movable unit is at a center valve position.

In FIG. 3, the curves in the upper portion of the figure indicate absolute values of magnetic flux density distributions along an AA line on the surface of the driving magnet 8 along which the Fo coils 3 and Tr coil are arranged.

As illustrated in FIG. 3, the interval Lc_Fo between centers of the Fo coils 3 in their tracking direction is set to be smaller than the interval Lm_Fo between the centers of the magnetic flux density distributions of the magnetization regions on the upper-left and upper-right portions of the driving magnet 8 enclosed by the two L-shaped boundary lines. If the Fo coils 3 are at ideal positions, the densities of the magnetic fluxes in the two opposite magnetization regions generated by the two Fo coils 3 should be equal; hence, if the same current is conducted in the two Fo coils 3, the two Fo coils 3 should generate two thrust forces having the same magnitude.

Figure 4:
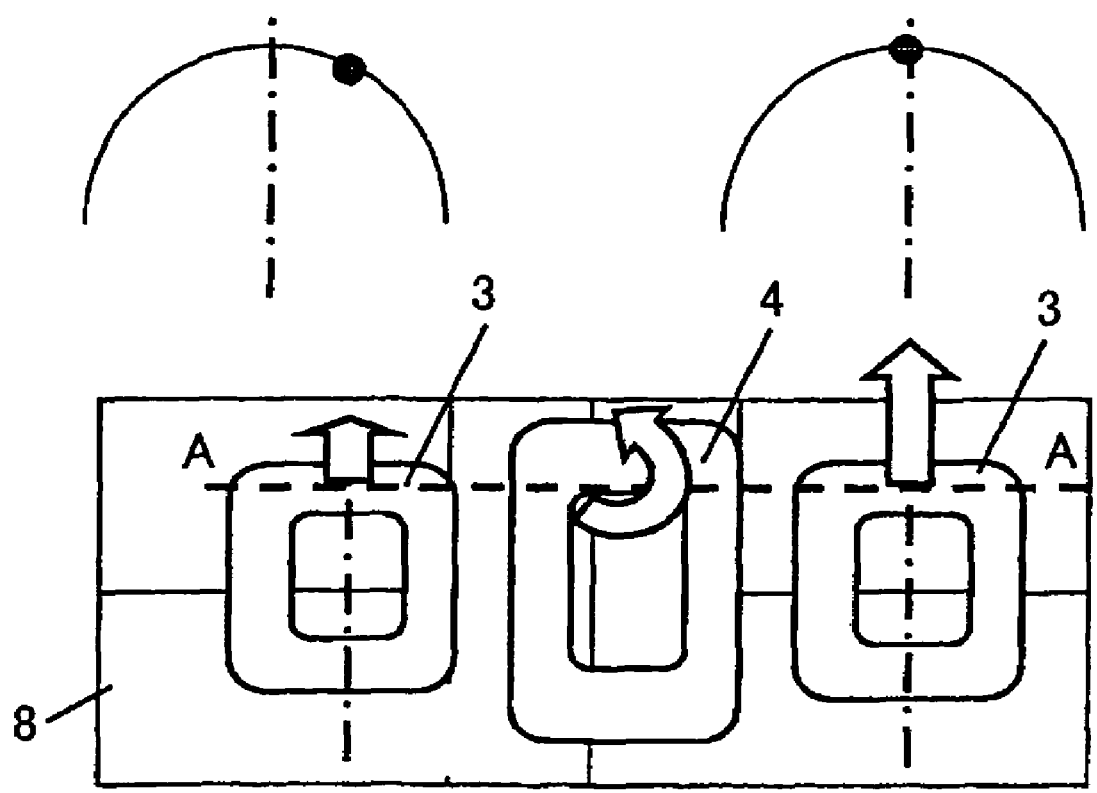
FIG. 4 is a plan view illustrating the driving forces generated by the focusing driving coils 3 when the movable unit is shifted from the center valve position.

FIG. 4 is a plan view illustrating the driving forces generated by the focusing driving coils 3 when the movable unit is shifted from the center valve position.

As illustrated in FIG. 4, when a focusing operation and a tracking operation are executed at the same time, the density of the magnetic flux generated by the driving magnet 8 has a distribution; hence, the focus driving forces generated by the respective Fo coils 3 have different magnitudes.

Specifically, when the movable unit is moved in the focus+ direction and the track+direction, the driving force in the focusing direction generated by the Fo coil 3 positioned on the−side along the tracking direction decreases. On the other hand, because the driving force in the focusing direction generated by the Fo coil 3 on the+side along the tracking direction is close to the center of the magnetic flux density distribution, the focus driving force thereof increases. Hence, a moment is imposed on the movable unit in the radial (rotational)+direction. In addition, if the focus driving direction and the tracking driving direction change, the direction of the moment also changes.

This moment is along a direction opposite to the direction (focus+, track+, radial direction) of a tilt caused by the supporting system, and due to this, this moment cancels out the tilt of the movable unit caused by the supporting system, and reduces the tilt of the movable unit in the supporting system.

When the moment induced by the thrust forces generated by the Fo coils 3 can be approximately expressed by the following formula (1), it is possible to effectively reduce the radial tilt (rotation), which is a main problem of the two-side-supporting structure illustrated in FIG. 1.

$$M = \alpha * Xfo * Xtr * k\theta / (kfo * ktr) \quad (1)$$

where α is a coefficient, Xfo represents the magnitude of a focusing movement, Xtr represents the magnitude of a tracking movement, kθ represents a tilt spring constant, kfo represents a spring constant in the focusing direction, and ktr represents a spring constant in the tracking direction.

An application radius of the moment induced by the Fo coils 3 changes along with a change of the interval Lc_Fo between centers of the Fo coils 3 in their tracking direction, and the respective thrust forces generated by the Fo coils 3 on the left side and the right side increase or decrease along with a change of the difference between the interval Lc_Fo between the Fo coils 3 and the interval Lm_Fo between the magnets 8. Certainly, the moment can also be altered by changing the size of the driving magnet, and thereby changing the magnetic flux density distributions.

The moment generated in the supporting system can be attributed to bending of the wire springs 5 in the focusing direction and the tracking direction. Thus, when the wire springs 5 are not bent, no moment is induced. When no moment is induced, the position of the movable unit may be set such that the center of the Fo coils 3 in the focusing direction is substantially in agreement with the center of the driving magnets 8 in the focusing direction. In doing so, the zero-points of the induced moment are in agreement, and thereby, it is possible to effectively reduce the tilt occurring in focusing operations and tracking operations.

Because sometimes the tilt cannot be fully cancelled out, it is preferable to set the zero-point to be a center of a movement range in the focusing direction.

In the above, a four-axis object lens driving device is used as an example, which is able to perform tilt driving operations, namely, radial tilt operations and tangential tilt operations, but certainly, the present embodiment is also applicable to a two-axis object lens driving device which is capable of only focusing operations and tracking operations.

Second Embodiment

Figure 5:
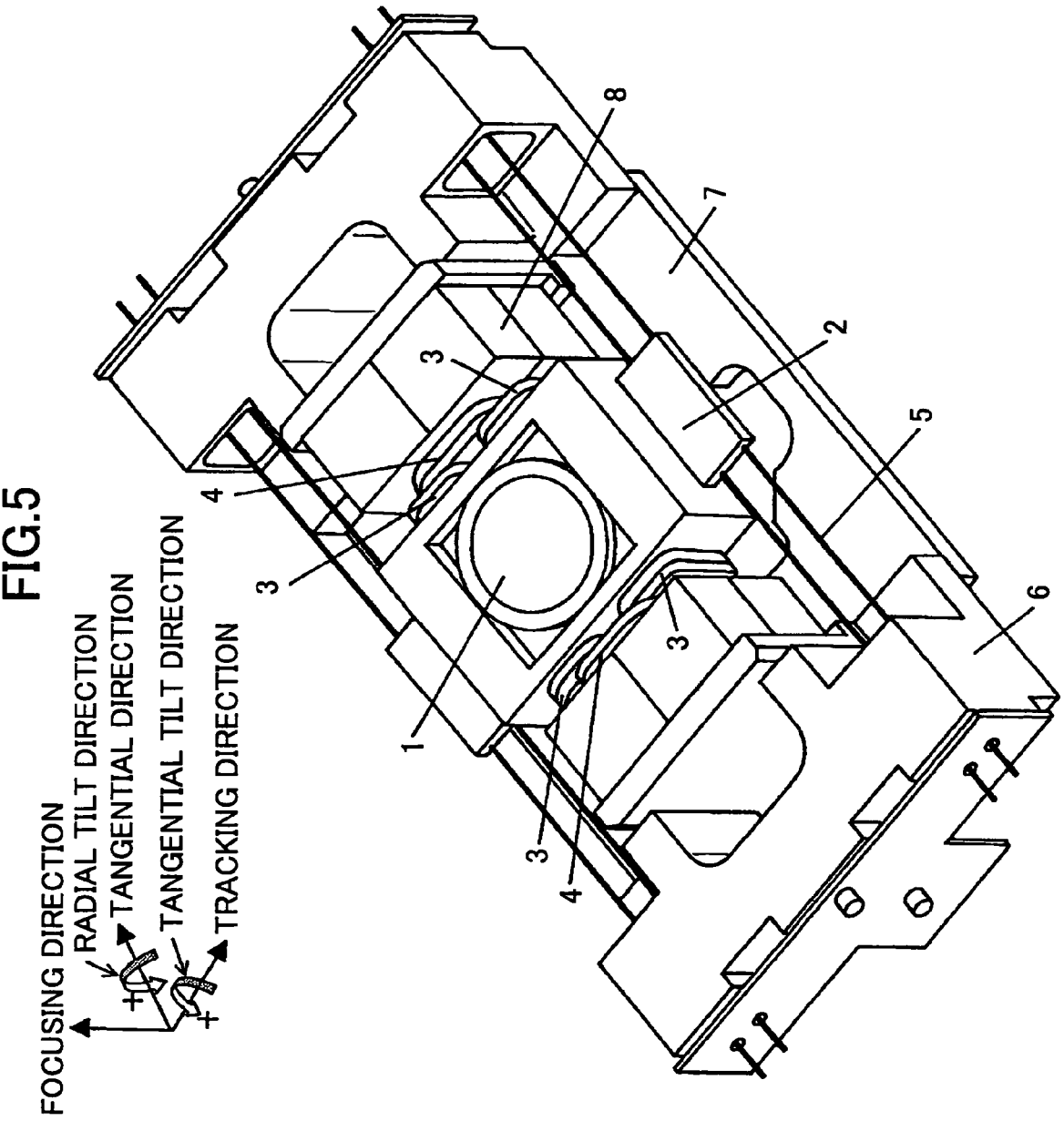
FIG. 5 is a perspective view illustrating an object lens driving device according to a second embodiment of the present invention.

FIG. 5 is a perspective view illustrating an object lens driving device according to a second embodiment of the present invention.

The object lens driving device according to the present embodiment basically has the same structure as that of the first embodiment as shown in FIG. 1, except for the shape of the hole in the base 7, the configuration of the driving magnets 8, and the arrangement of the driving coils. Below, the same reference numbers are assigned to the same elements as those described in the first embodiment, and overlapping descriptions are omitted.

Figure 6:
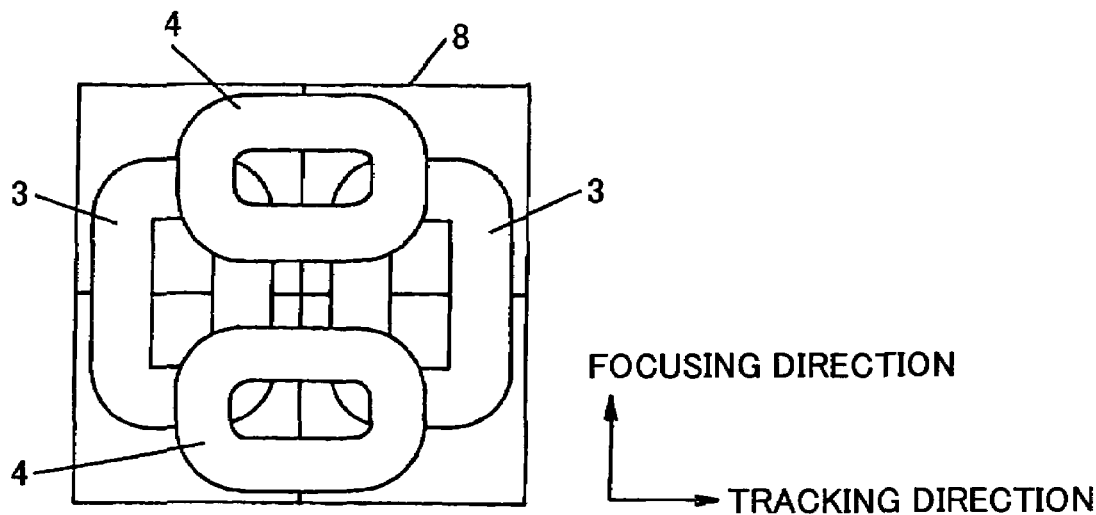
FIG. 6 is a plan view illustrating a structure of the driving motor in the object lens driving device in FIG. 5.

FIG. 6 is a plan view illustrating a structure of the driving motor in the object lens driving device in FIG. 5.

As illustrated in FIG. 6, the driving magnet 8 has four magnetization regions, which are defined by two lines forming a cross, including a boundary line passing through the center of the driving magnet 8 and parallel to the focusing direction, and a boundary line passing through the center of the driving magnet 8 and parallel to the tracking direction. Neighboring magnetization regions have magnetic poles opposite to each other.

On two side surfaces along the tangential direction of the object lens holding member 2, two Fo coils 3 are arranged along the tracking direction as a row, and two Tr coils 4 are arranged between the Fo coils 3 and partially overlap with the Fo coils 3. The two Tr coils 4 are arranged along the focusing direction as a row. When the driving coils are placed to face the driving magnets 8, the two track driving coils 4 oppose the boundary line parallel to the focusing direction, and the Fo coils 3 oppose the boundary lines parallel to the tracking direction.

Figure 7:
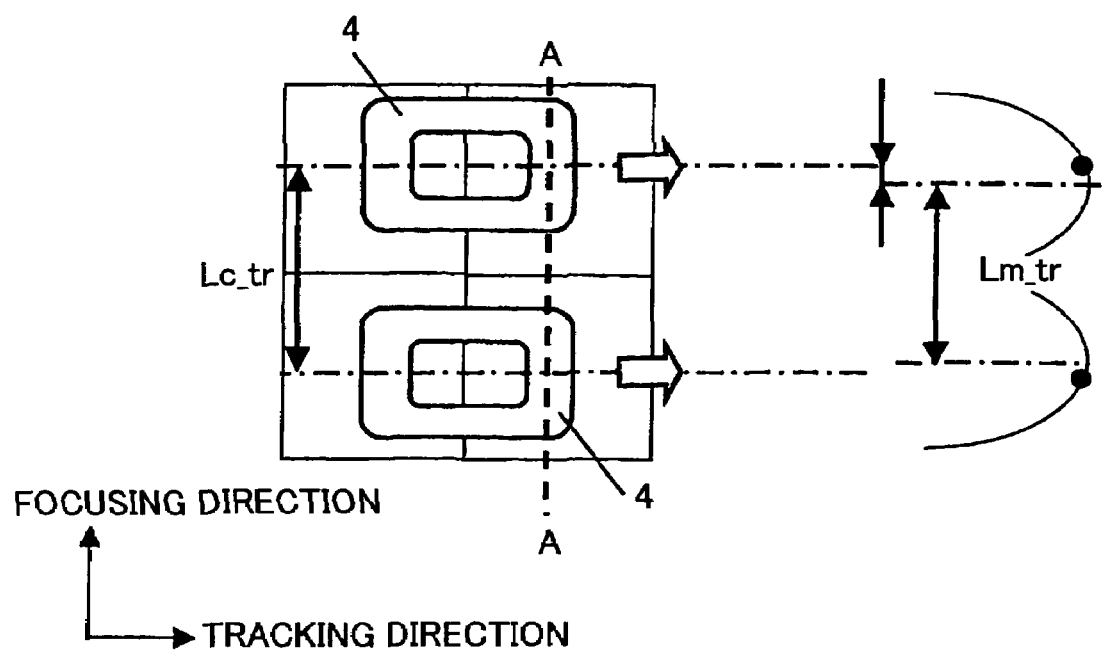
FIG. 7 is a plan view illustrating the driving forces generated by the tracking driving coils 4 when the movable unit is at a center valve position.

FIG. 7 is a plan view illustrating the driving forces generated by the tracking driving coils 4 when the movable unit is at a center valve position.

Figure 8:
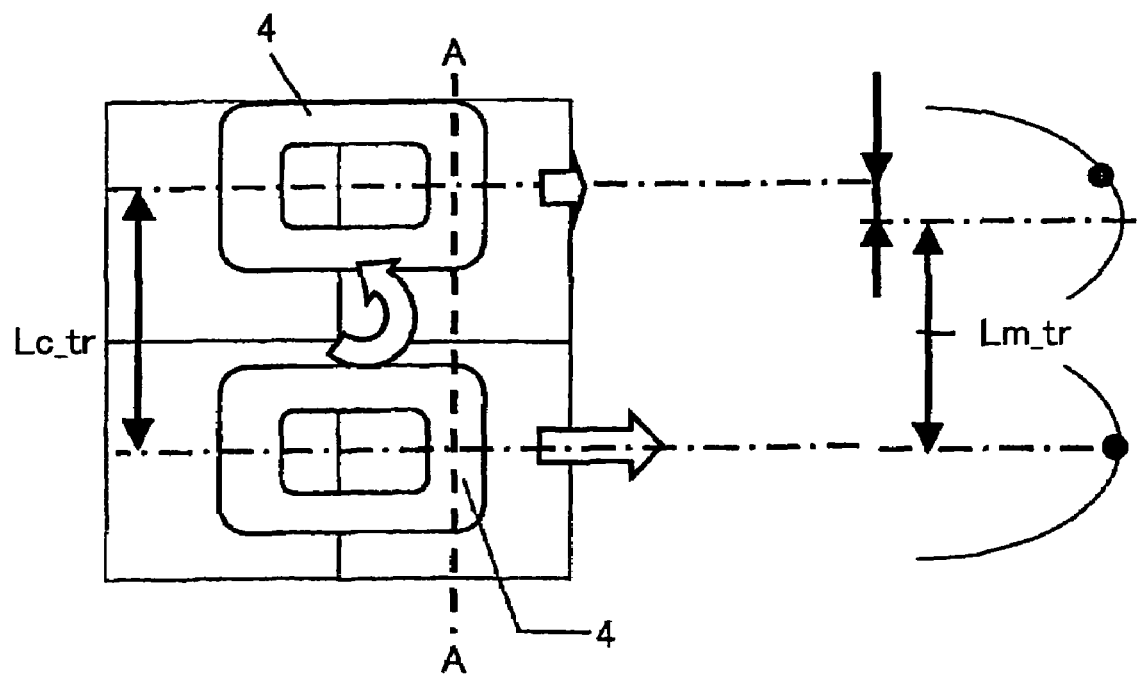
FIG. 8 is a plan view illustrating the driving forces generated by the tracking driving coils 4 when the movable unit is shifted from the center valve position.

FIG. 8 is a plan view illustrating the driving forces generated by the tracking driving coils 4 when the movable unit is shifted from the center valve position.

In FIG. 7 and FIG. 8, the curves on the right side indicate absolute values of magnetic flux density distributions along an AA line on the surface of the driving magnet 8 on which the Fo coils 3 and Tr coil are arranged.

As illustrated in FIG. 7 and FIG. 8, because the driving magnets 8 and the driving coils are arranged so that the driving forces of the two Tr coils 4 are different during focusing operations and tracking operations, as described in the first embodiment, a moment is generated.

Different from the first embodiment, in the present embodiment, the interval Lc_tr of Tr coils 4 is set to be greater than the interval Lm_tr of the centers of magnetic flux density distributions of the corresponding driving magnets 8, in movements along the focus+direction and the track+direction, a moment is generated in the radial+direction, and thereby, the tilt occurring in the supporting system in the radial−direction can be cancelled out.

Third Embodiment

Figure 9:
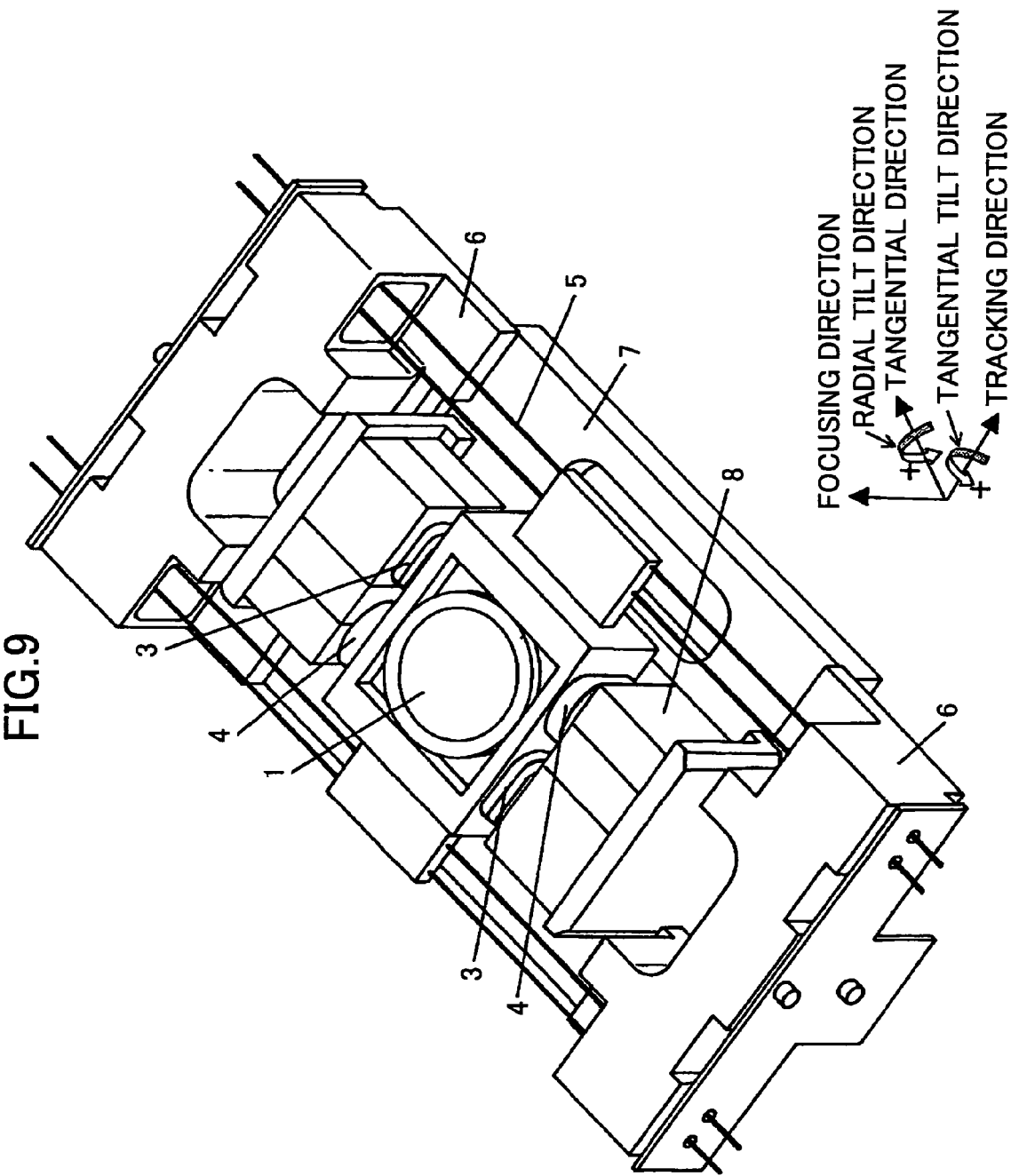
FIG. 9 is a perspective view illustrating an object lens driving device according to a third embodiment of the present invention.

FIG. 9 is a perspective view illustrating an object lens driving device according to a third embodiment of the present invention.

The object lens driving device according to the present embodiment basically has the same structure as that of the first embodiment as shown in FIG. 1, except for the configuration of the driving magnet 8 and arrangement of the driving coils. Below, the same reference numbers are assigned to the same elements as those described in the first embodiment, and overlapping descriptions are omitted.

Figure 10:
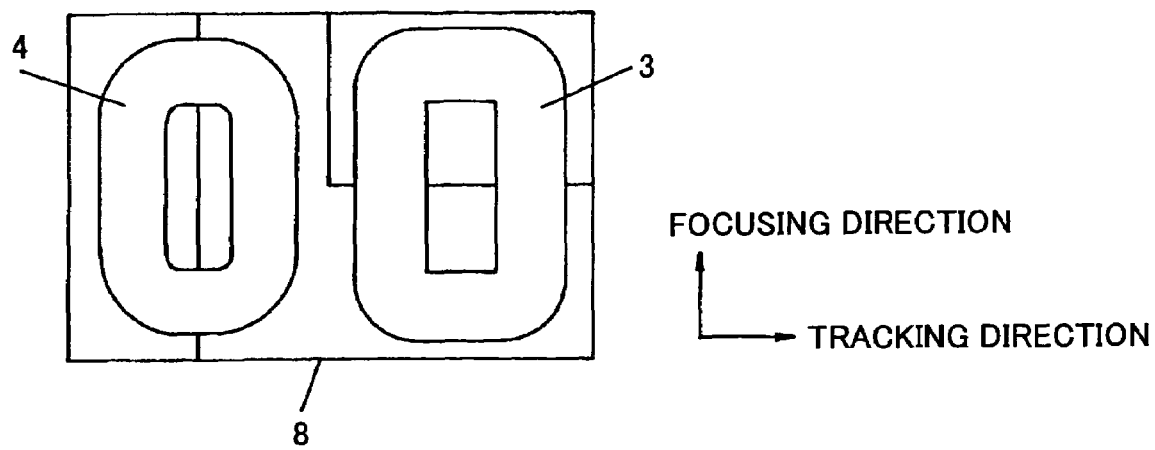
FIG. 10 is a plan view illustrating a structure of the driving motor in the object lens driving device in FIG. 9.

FIG. 10 is a plan view illustrating a structure of the driving motor in the object lens driving device in FIG. 9.

As illustrated in FIG. 10, the driving magnet 8 has three magnetization regions, which are defined by an L-shaped boundary line including a section extending to the center of the driving magnet 8 and parallel to the focusing direction and a section extending to the center of the driving magnet 8 and parallel to the tracking direction, and a boundary line parallel to and beside the section of the L-shaped boundary line parallel to the focusing direction. Neighboring magnetization regions have magnetic poles opposite to each other.

On two side surfaces along the tangential direction of the object lens holding member 2, a Fo coil 3 and a Tr coil 4 are arranged along the tracking direction as a row. When the Fo coil 3 and the Tr coil 4 are placed to face the driving magnets 8, the Fo coil 3 opposes the section of the L-shaped boundary line parallel to the tracking direction, and the two track driving coil 4 opposes the boundary line beside the L-shaped boundary line.

In the first and second embodiments, during movements in both the focus direction and the track direction, a moment is generated due to a difference between the driving forces of the two coils. In the present embodiment, a moment is generated by using only one focusing motor having a double-pole magnet and a planar coil plural.

Figure 11:
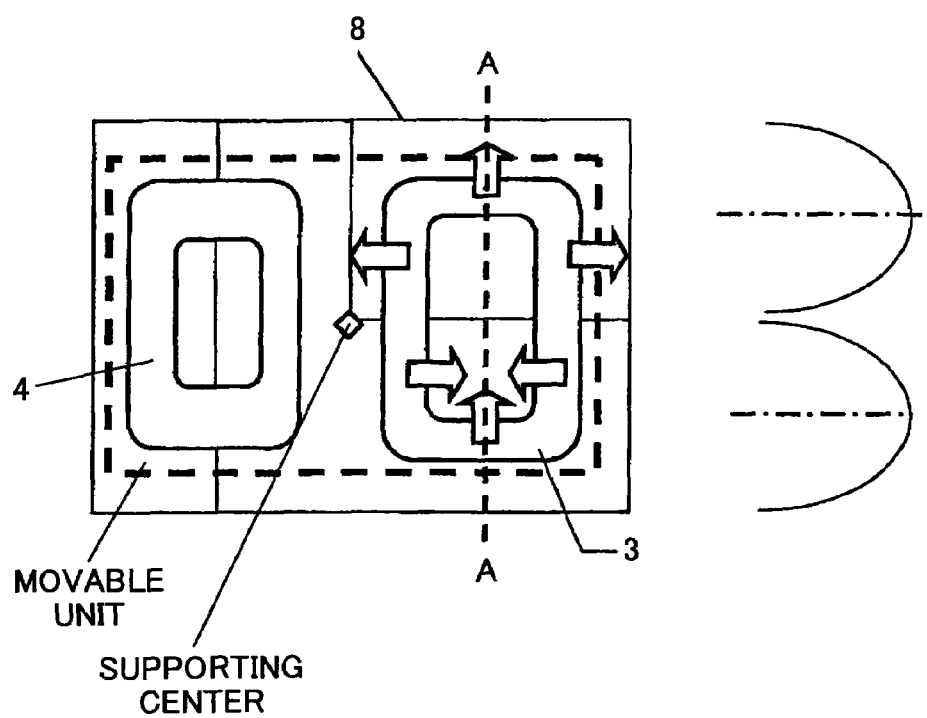
FIG. 11 is a plan view illustrating the driving force generated by the tracking driving coil 4 when the movable unit is at a center valve position.

FIG. 11 is a plan view illustrating the driving force generated by the tracking driving coil 4 when the movable unit is at a center valve position.

In FIG. 11, the curves on the right side indicate absolute values of magnetic flux density distributions along an AA line on the surface of the driving magnet 8 on which the Fo coils 3 and Tr coil are arranged.

Figure 12:
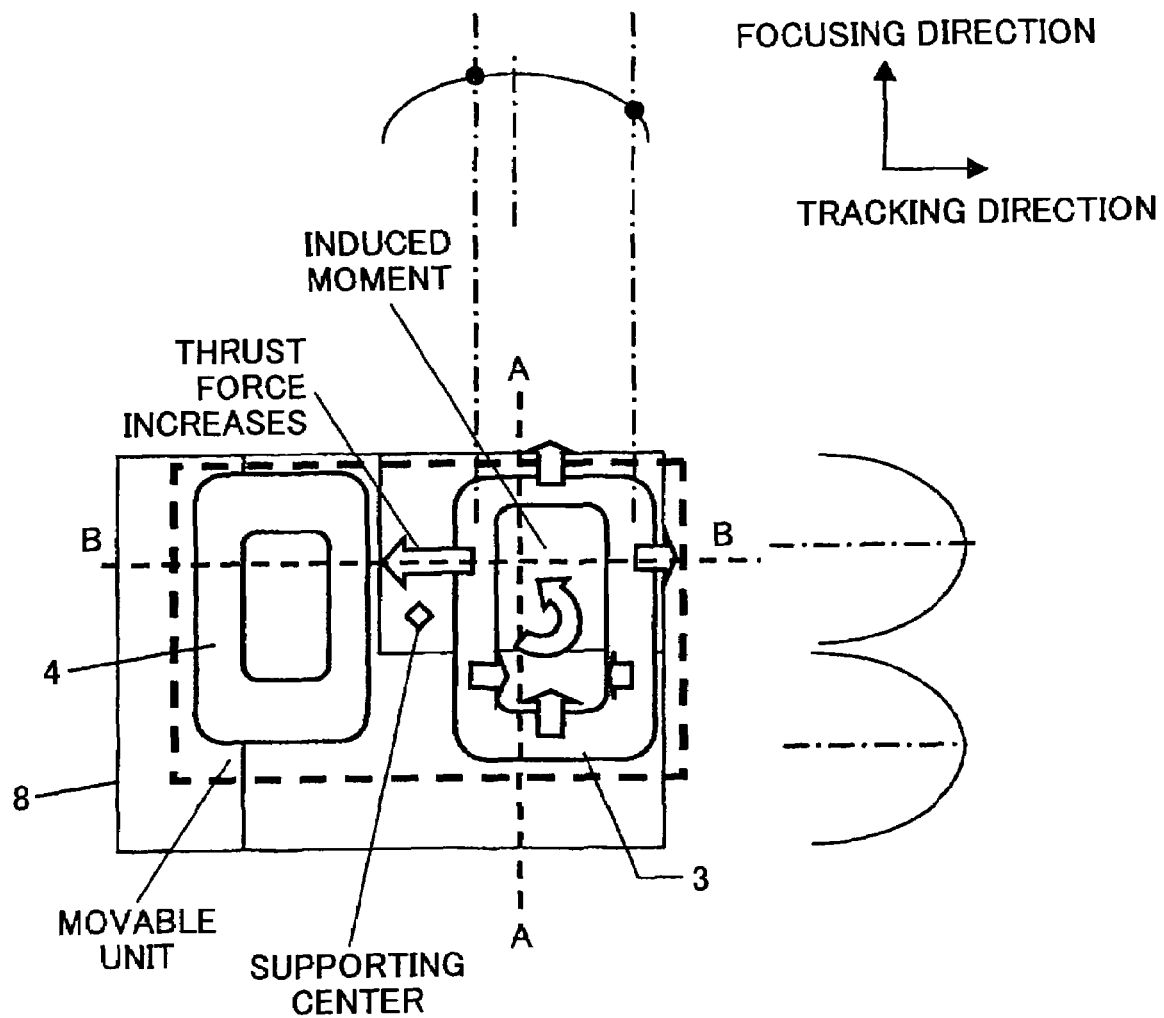
FIG. 12 is a plan view illustrating the driving force generated by the tracking driving coil 4 when the movable unit is shifted from the center valve position.

FIG. 12 is a plan view illustrating the driving force generated by the tracking driving coil 4 when the movable unit is shifted from the center valve position.

In FIG. 12, the curves on the upper side indicate absolute values of magnetic flux density distributions along a BB line on the surface of the driving magnet 8 on which the Fo coils 3 and Tr coil are arranged. The curves on the right side indicate absolute values of magnetic flux density distributions along an AA line on the surface of the driving magnet 8 on which the Fo coils 3 and Tr coil are arranged.

As illustrated in FIG. 11 and FIG. 12, the Fo coil 3 is arranged to cross the boundary line, and two sides of the Fo coil 3 not crossing the boundary line function as operative portions. The Fo coil 3 is arranged so that the thrust force generated by one operative portion in which an electrical current flows in the focusing direction counterbalances the moment when the movable unit is near the center.

During focusing operations and tracking operations, the Fo coil 3 and the Tr coil 4 are shifted from the center relative to the driving magnet, and the density of the magnetic flux generated by the driving magnet 8 has a distribution, thereby, obtaining the thrust force generated by the operative portion in which an electrical current flows in the focusing direction, as illustrated in FIG. 12. The moment induced at this time is in the radial+direction during movement in the focus+direction and the track+direction.

Therefore, the tilt occurring in the supporting system in the radial−direction can be cancelled out, and the overall tilt can be reduced. In addition, the moment generated by a non-operative portion can be altered by setting the length of the non-operative portion to be greater than the length of the operative portion, or by changing the shape of the driving magnets and the driving coils.

Fourth Embodiment

Figure 13:
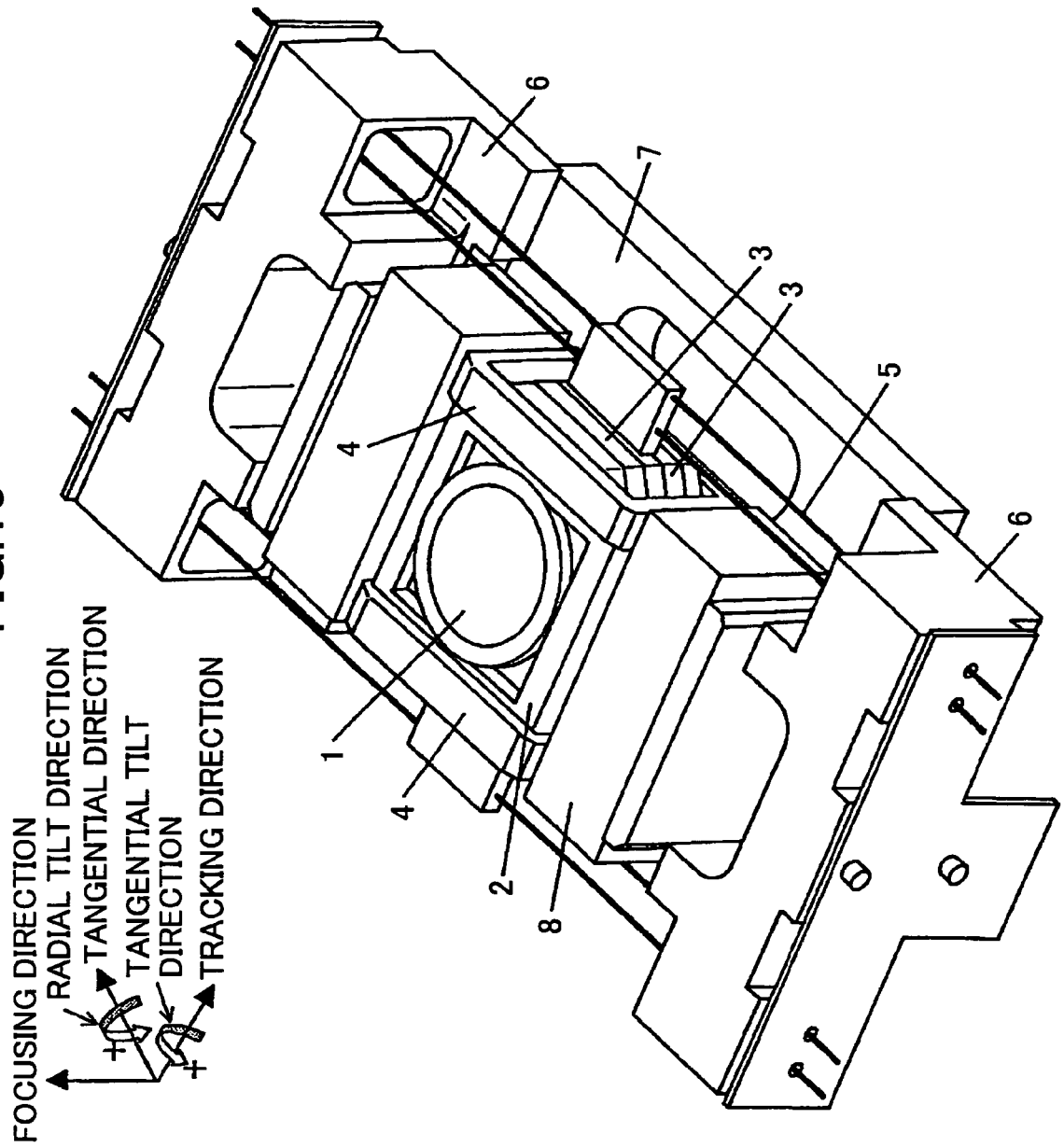
FIG. 13 is a perspective view illustrating an object lens driving device according to a fourth embodiment of the present invention.

FIG. 13 is a perspective view illustrating an object lens driving device according to a fourth embodiment of the present invention.

The object lens driving device according to the present embodiment basically has the same structure as that of the first embodiment as shown in FIG. 1, except for the configuration of the driving magnet 8 and arrangement of the driving coils. Below, the same reference numbers are assigned to the same elements as those described in the first embodiment, and overlapping descriptions are omitted.

In the object lens driving device according to the present embodiment, the moment generated by an operative portion of the track driving coil 4 is utilized to cancel out the tilt of the movable unit caused by the supporting system.

Figure 14:
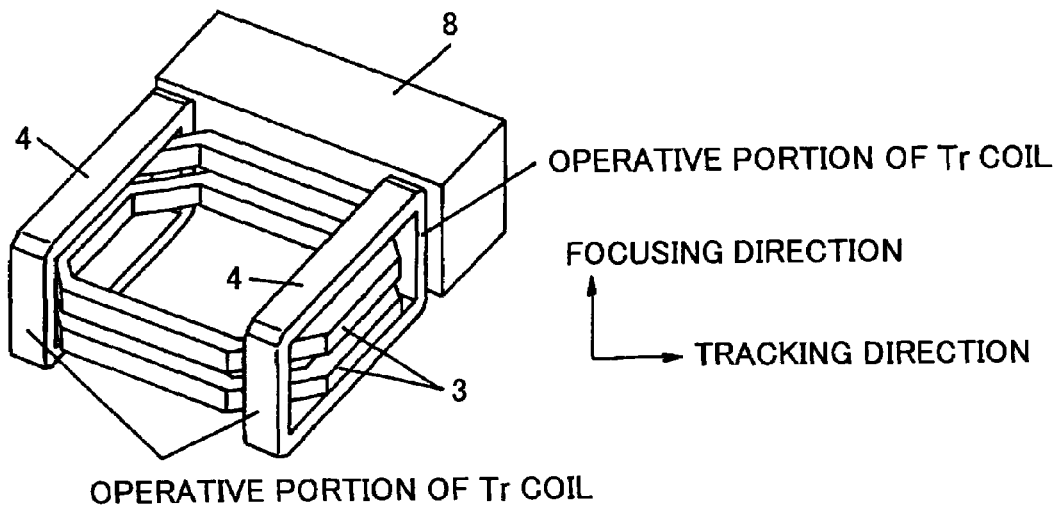
FIG. 14 is a perspective view of the driving motor in the object lens driving device in FIG. 13.

FIG. 14 is a perspective view of the driving motor in the object lens driving device in FIG. 13.

As illustrated in FIG. 14, the driving magnet 8 has only one magnetic pole, which is to be arranged to face the movable unit. The driving motor includes two Fo coils 3, two Tr coils 4, and the driving magnet 8.

The Fo coil 3 is wound on the object lens holding member 2 with the focusing direction as a winding axis. The Tr coil 4 is wound with the tracking direction as a winding axis. The driving magnet 8 is arranged so that the magnetic flux thereof penetrates these driving coils in the tangential direction.

Figure 15:
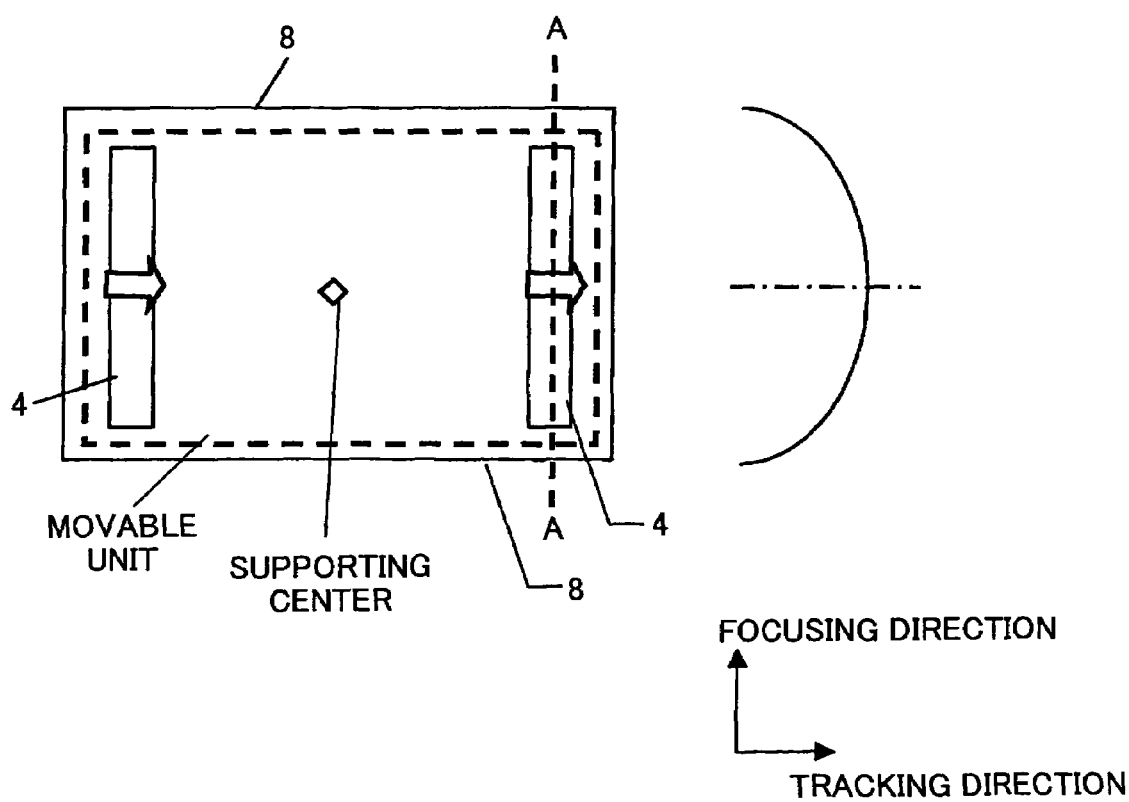
FIG. 15 is a plan view illustrating the driving force generated by the tracking driving coils 4 when the movable unit is at a center valve position.

FIG. 15 is a plan view illustrating the driving force generated by the tracking driving coils 4 when the movable unit is at a center valve position.

In FIG. 15, the curve on the right side indicates absolute values of magnetic flux density distributions along an AA line on the surface of the driving magnet 8 on which operative portions of the Tr coil are arranged.

Figure 16:
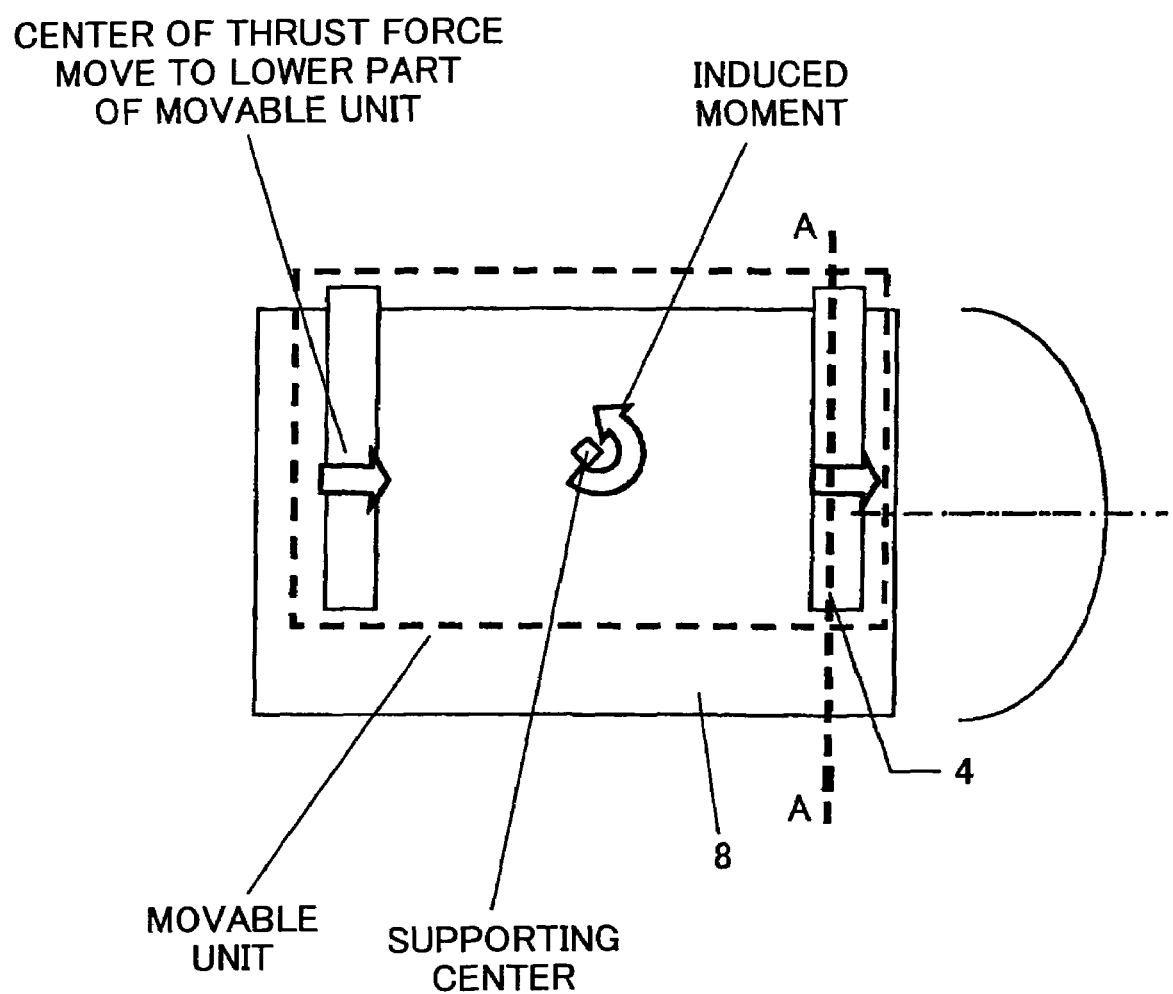
FIG. 16 is a plan view illustrating the driving force generated by the tracking driving coils 4 when the movable unit is shifted from the center valve position.

FIG. 16 is a plan view illustrating the driving force generated by the tracking driving coils 4 when the movable unit is shifted from the center valve position.

In FIG. 16, the curve on the right side indicates absolute values of magnetic flux density distributions along an AA line on the surface of the driving magnet 8 on which operative portions of the Tr coil are arranged.

As illustrated in FIG. 15 and FIG. 16, the length of the Tr coil 4 in the focusing direction is set to be greater than the length of the driving magnet in the focusing direction, and when the movable unit moves in the focusing direction, the Tr coil 4 runs off the edge. Because of such a structure, when the focusing operation and the tracking operation are performed at the same time, the density distribution of the magnetic flux penetrating operative portions of the Tr coils 4 becomes non-uniform, hence, a moment is generated.

The thus induced moment is in the radial+direction, because the thrust force imposed on the lower part of the movable unit increases when moving in the focus+direction and the track+direction. Therefore, the tilt occurring in the supporting system in the radial−direction can be cancelled out, and the overall tilt can be reduced.

Fifth Embodiment

Figure 17:
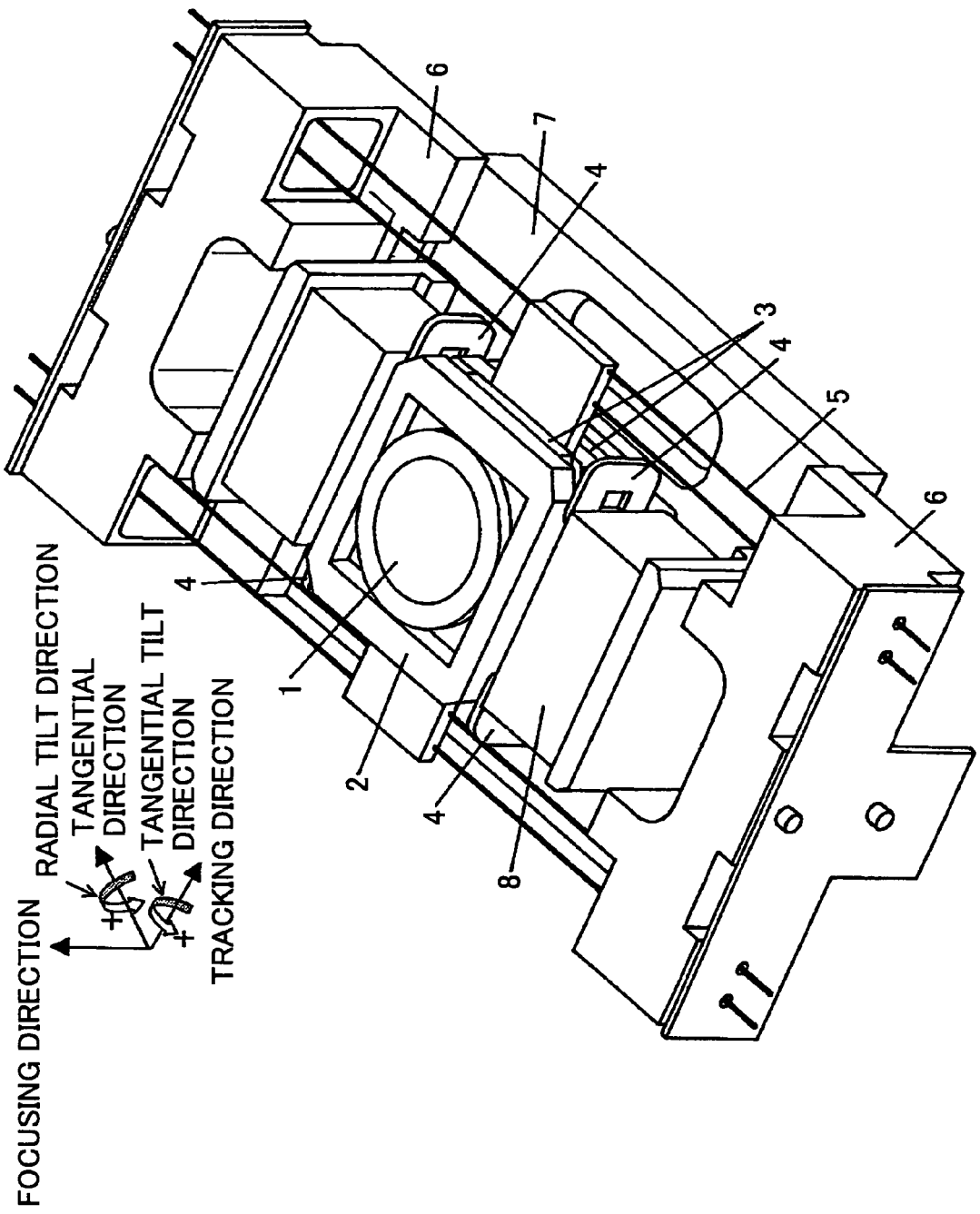
FIG. 17 is a perspective view illustrating an object lens driving device according to a fifth embodiment of the present invention.

FIG. 17 is a perspective view illustrating an object lens driving device according to a fifth embodiment of the present invention.

The object lens driving device according to the present embodiment basically has the same structure as that of the first embodiment as shown in FIG. 1, except for the configuration of the driving magnet 8 and arrangement of the driving coils. Below, the same reference numbers are assigned to the same elements as those described in the first embodiment, and overlapping descriptions are omitted.

In the object lens driving device according to the present embodiment, the Tr coils 4 shown in FIG. 13 in the fourth embodiment is replaced by two pairs of nearly rectangular or square planar Tr coils 4. The length of a non-operative portion of the Tr coils 4, in which an electric current flows in the tracking direction, is set to be greater than an operative portion of the Tr coils 4, which is a side of the Tr coil parallel to the focusing direction.

Because of such a structure, the thrust force in the focusing direction generated at the non-operative portion when the focusing operation and the tracking operation are performed at the same time can be utilized to cancel out the tilt occurring in the supporting system.

Figure 18:
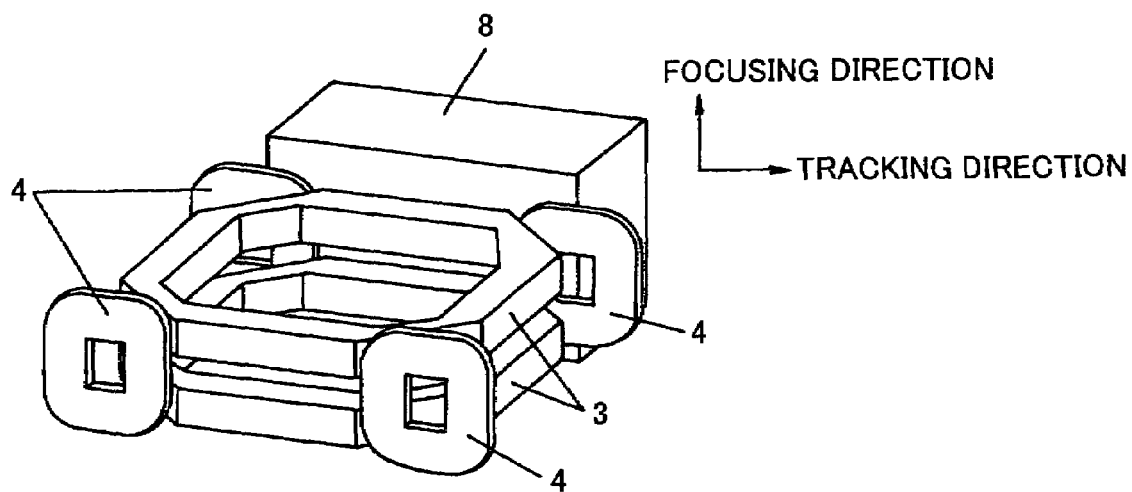
FIG. 18 is a perspective view of the driving motor in the object lens driving device in FIG. 17.

FIG. 18 is a perspective view of the driving motor in the object lens driving device in FIG. 17.

As illustrated in FIG. 18, the driving magnet 8 has only one magnetic pole, which is to be arranged to face the movable unit. The driving motor includes two Fo coils 3, two pairs of planar Tr coils 4, and the driving magnet 8.

The Fo coils 3 are wound on the object lens holding member 2 with the focusing direction as a winding axis. The Tr coils 4 are attached to the two side surfaces along the tangential direction of the object lens holding member 2. The driving magnet 8 is arranged so that the magnetic flux thereof penetrates the two pairs of Tr coils 4 in the tangential direction. Centers of the Tr coils 4 are opposed to two ends of each of the driving magnets 8 along the tracking direction.

Figure 19:
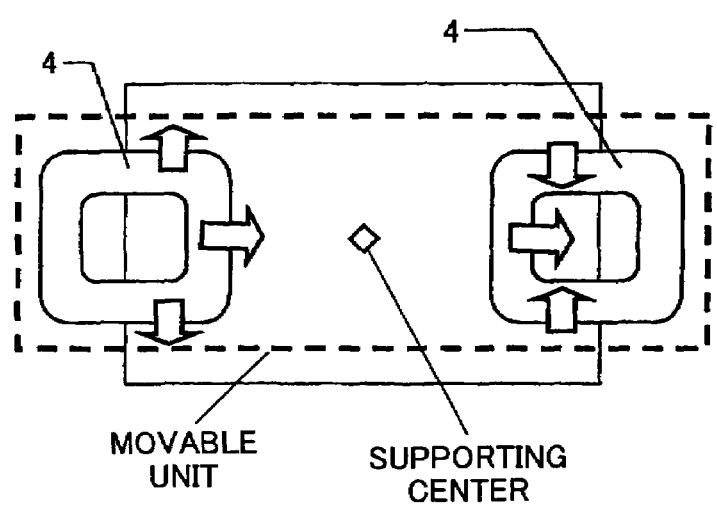
FIG. 19 is a plan view illustrating the driving force generated by the tracking driving coils 4 when the movable unit is at a center valve position.

FIG. 19 is a plan view illustrating the driving force generated by the tracking driving coils 4 when the movable unit is at a center valve position.

Figure 20:
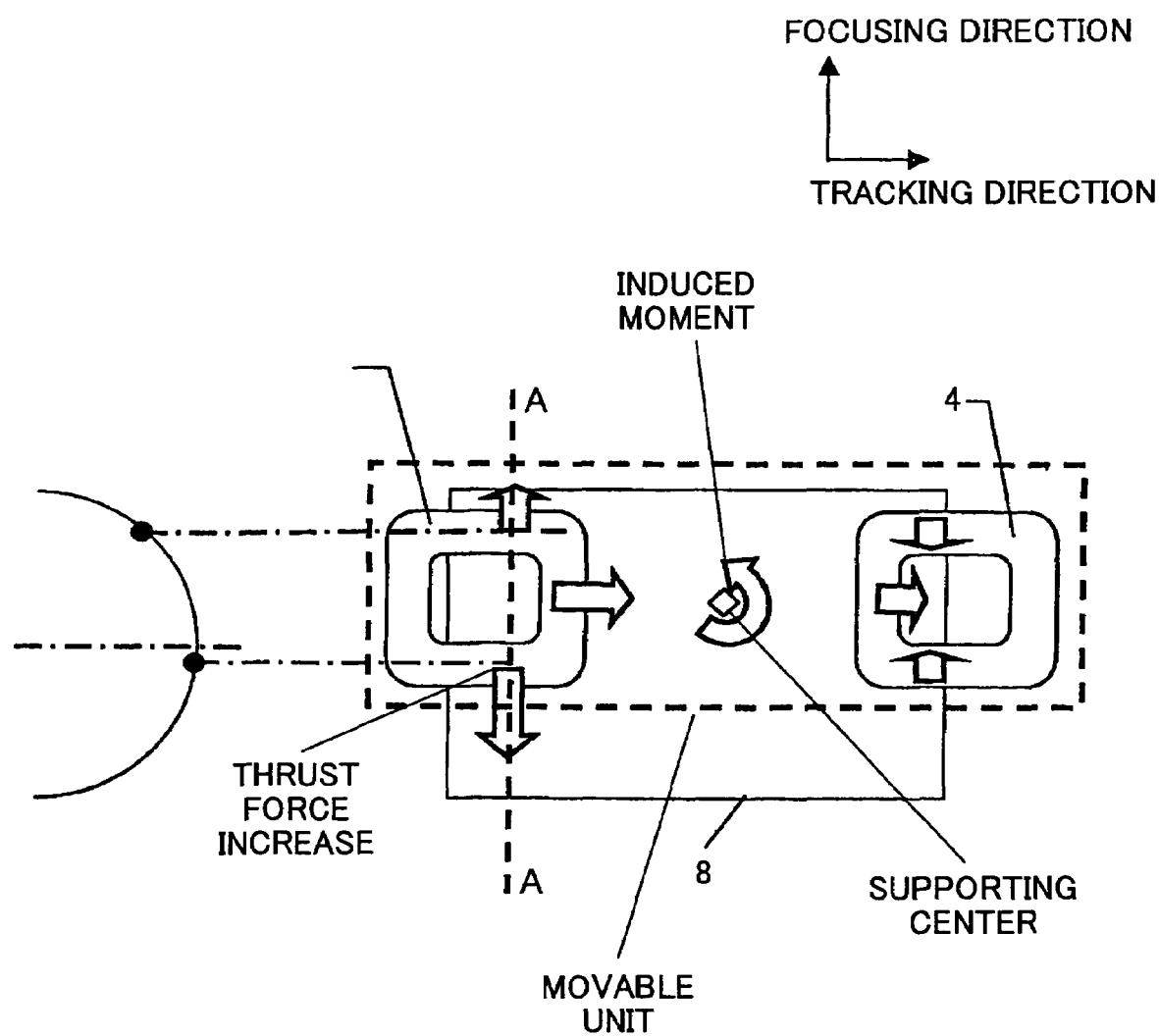
FIG. 20 is a plan view illustrating the driving force generated by the tracking driving coils 4 when the movable unit is shifted from the center valve position.

FIG. 20 is a plan view illustrating the driving force generated by the tracking driving coils 4 when the movable unit is shifted from the center valve position.

In FIG. 20, the curve on the left side indicates absolute values of a magnetic flux density distribution along an AA line on the surface of the driving magnet 8 on which the Tr coils are arranged.

When focusing operations and tracking operations are performed at the same time, the Fo coils 3 and the Tr coils 4 are shifted from the center relative to the driving magnet 8, and the density of the magnetic flux generated by the driving magnet 8 has a distribution. Thereby, a thrust force is generated by an operative portion of the Tr coils 4 in which an electrical current flows in the focusing direction, as illustrated in FIG. 20. The moment induced at this time is in the radial+ direction during movement in the focus+direction and the track+direction. Therefore, the tilt occurring in the supporting system in the radial−direction can be cancelled out, and the overall tilt can be reduced. In addition, the moment generated by a non-operative portion can be altered by setting the length of the non-operative portion to be greater than the length of the operative portion, or by changing the shape of the driving magnets 8 and the Tr coils 4.

Sixth Embodiment

Figure 21:
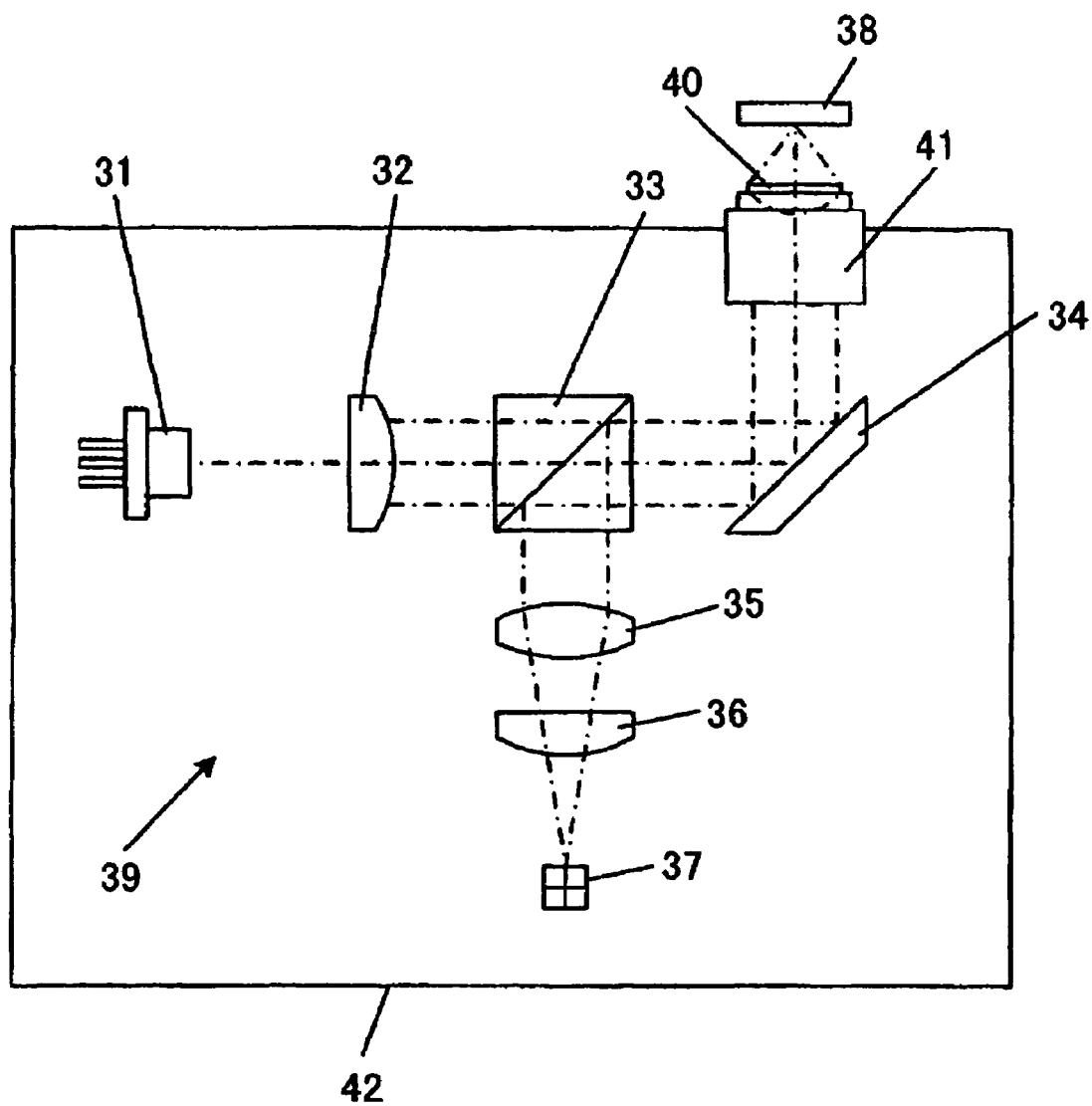
FIG. 21 is a view schematically illustrating a configuration of an optical pickup according to a sixth embodiment of the present invention, including the object lens driving device of the previous embodiments.

FIG. 21 is a view schematically illustrating a configuration of an optical pickup according to a sixth embodiment of the present invention, including the object lens driving device of the previous embodiments.

The optical pickup 39 illustrated in FIG. 21 includes a laser 31, a collimator lens 32, a beam splitter 33, a mirror 34, a condensing lens 35, a cylindrical lens 36, a light reception element 37, a recording medium 38, an object lens 40, and an object lens driving device 41.

The laser 31 emits a diffused laser beam, and the collimator lens 32 converts the diffused laser beam into a nearly parallel beam. Then, the beam passes through the beam splitter 33, and is deflected by the mirror 34. The deflected parallel beam is incident onto the object lens 40 included in the object lens driving device 41 mounted in an optical housing 42, forming a spot on the recording medium 38.

The reflected light from the recording medium 38 is deflected by the mirror 34 and the beam splitter 33, passes through the condensing lens 35 and the cylindrical lens 36, and is incident on the light reception element 37. The light reception element 37 is placed beforehand at a position so that the reflected light from the recording medium 38 can be received. Based on signals from the light reception element 37, focus driving coils and track driving coils in the object lens driving device 41 are controlled so that the object lens driving device 41 drives the object lens 40 to move along tracks on the recording medium 38. In this way, data recorded in the recording medium 38 can be obtained.

The object lens driving device 41 may be any one of those disclosed in the first through fifth embodiments. As described above, because the object lens driving devices disclosed in the first through fifth embodiments are superior in tilt characteristics, it is possible to provide an optical pickup able to obtain signals of high quality for recording and reproduction.

Seventh Embodiment

Figure 22A:
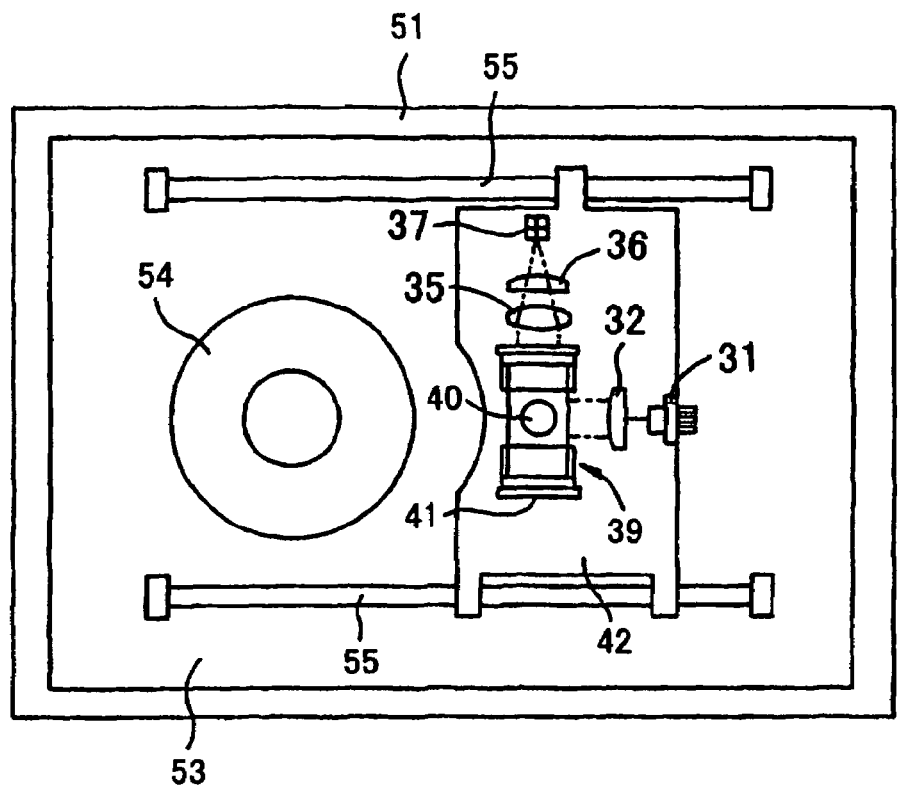
FIGS. 22A and 22B are a top view and a cross-sectional view schematically illustrating a configuration of an optical disk drive according to a seventh embodiment of the present invention, including the optical pickup in FIG. 21.
Figure 22B:
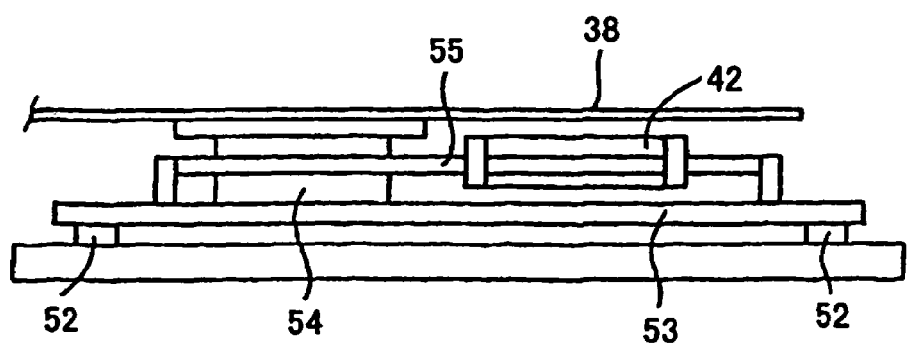
Figure 23:
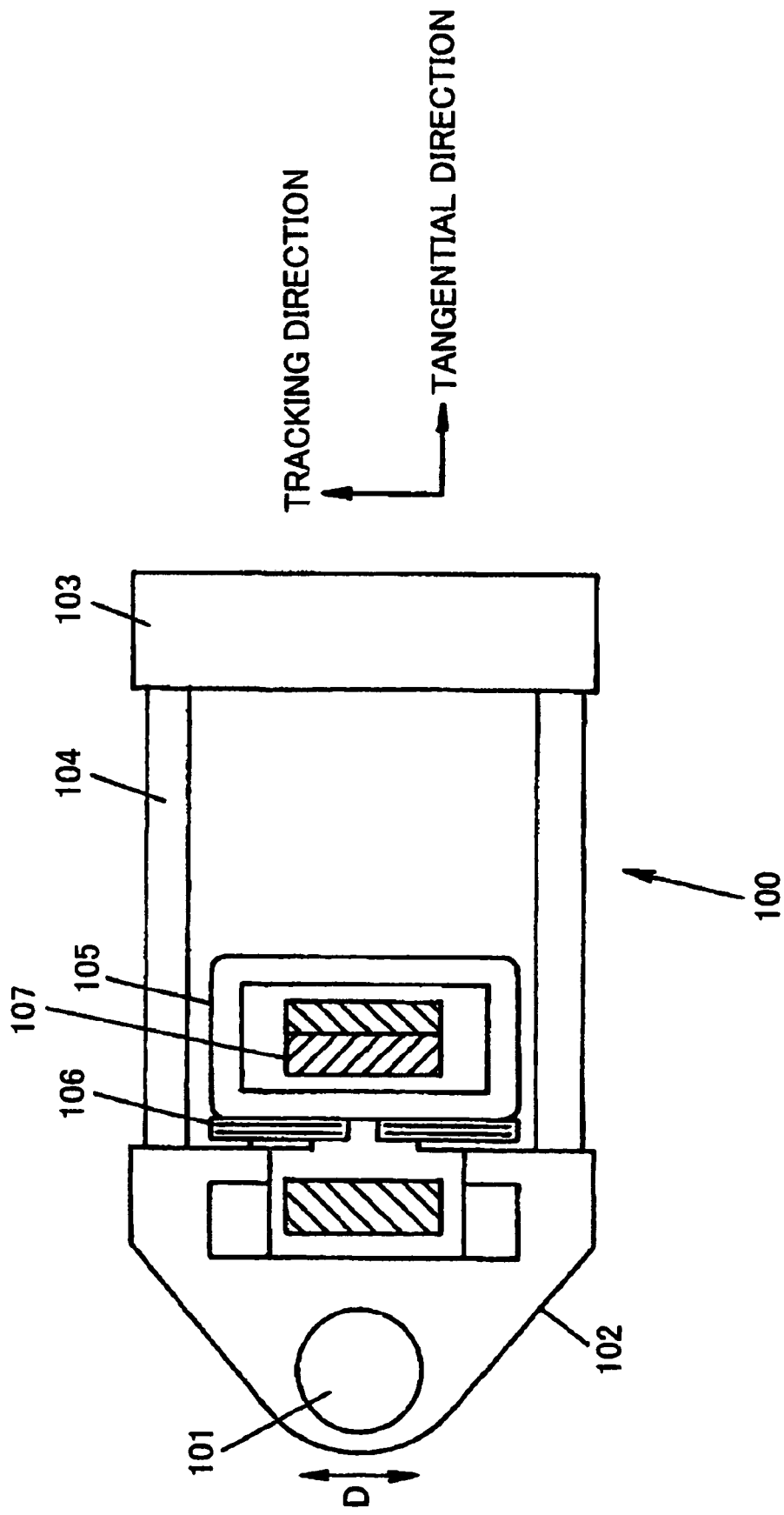
FIG. 23 is a cross-sectional view illustrating a schematic configuration of a two-axis object lens driving device as a first example of the related art.
Figure 25:
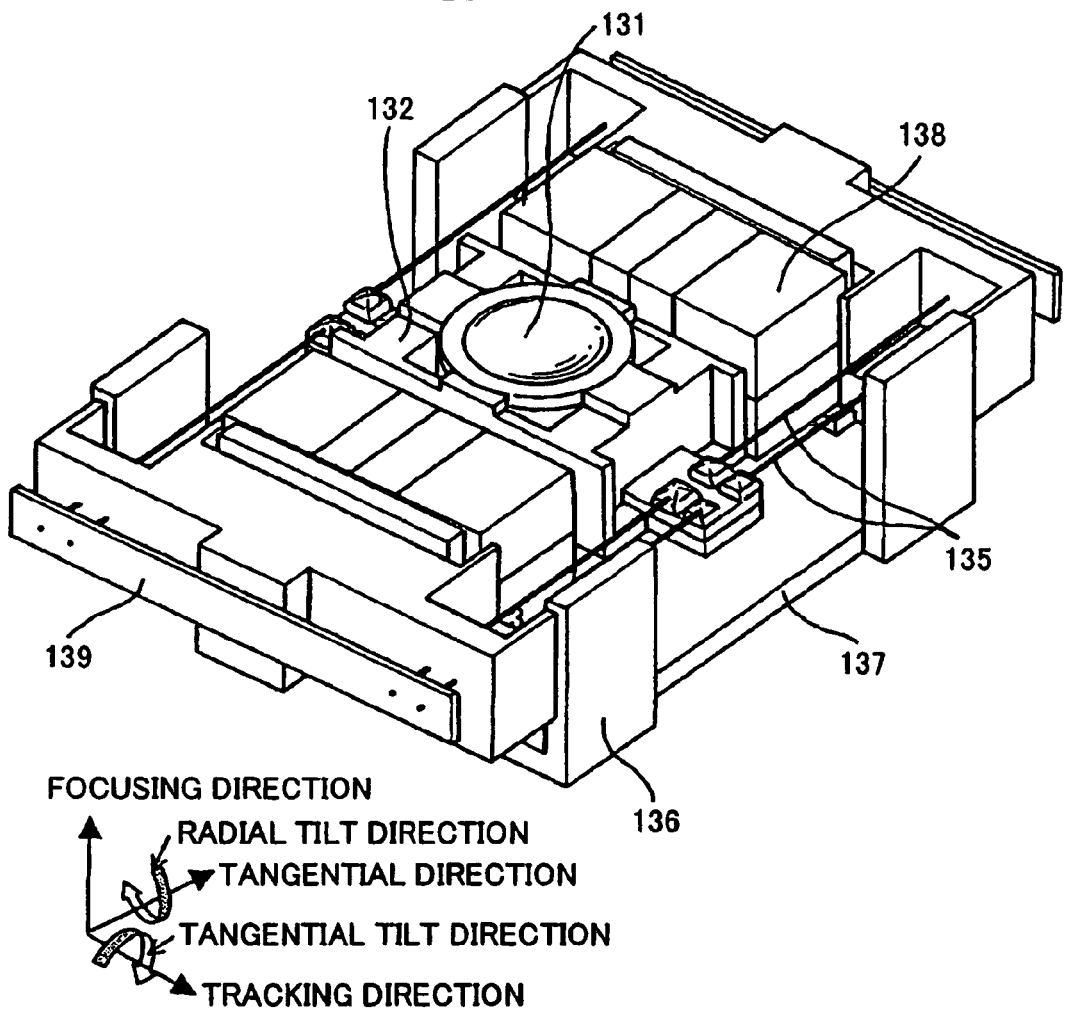
FIG. 25 is a perspective view illustrating a schematic configuration of an object lens driving device as a third example of the related art.
Figure 26:
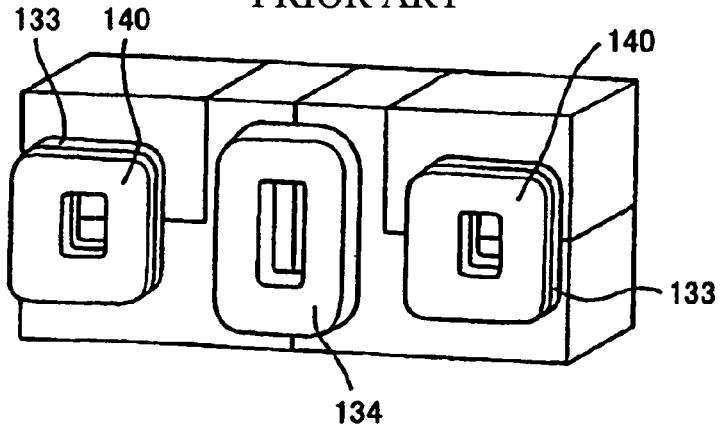
FIG. 26 is a perspective view illustrating a configuration of a driving motor in the object lens driving device in FIG. 25.
Figure 27:
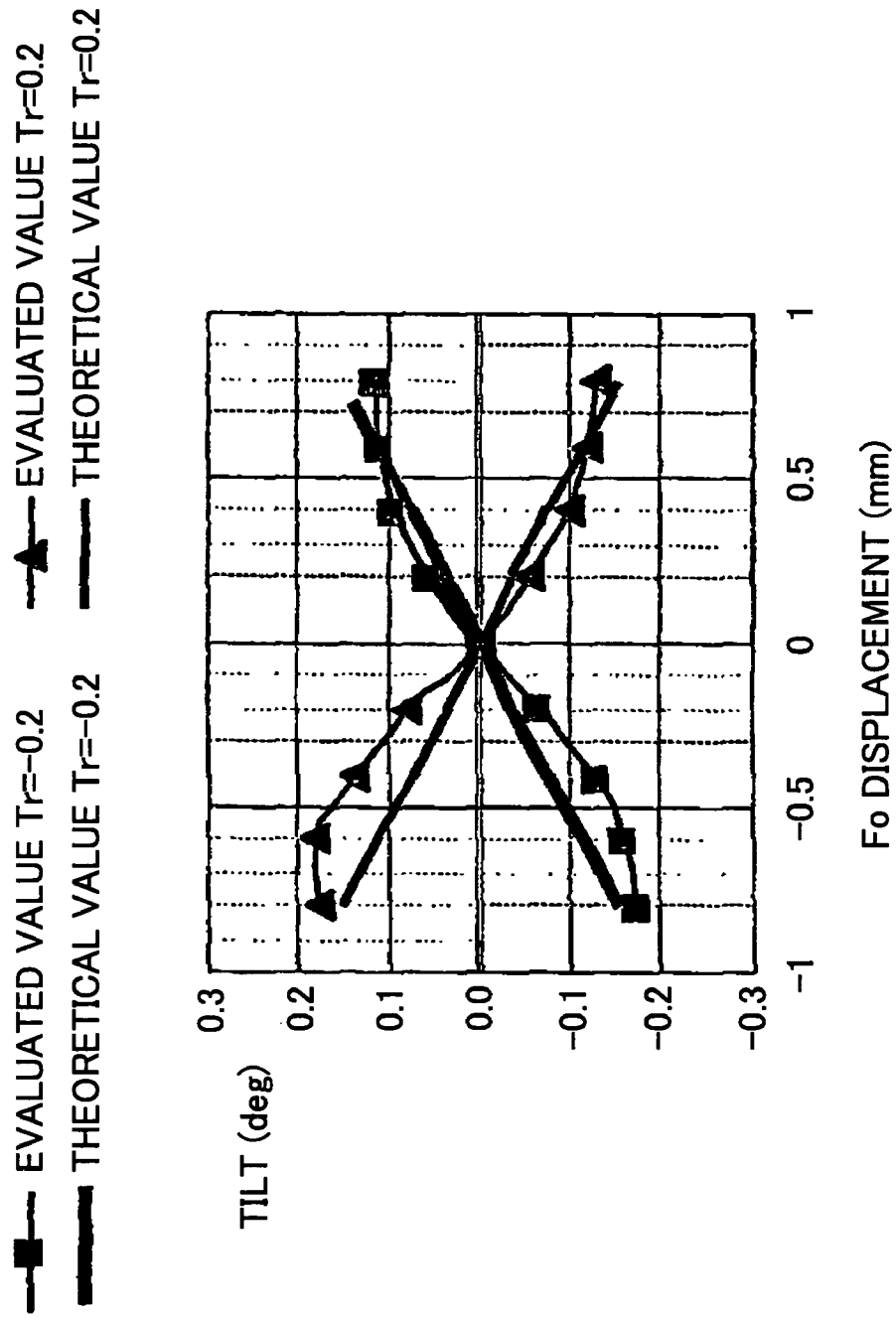
FIG. 27 presents typical tilts arising in the supporting system in the object lens driving device shown in FIG. 25.
Figure 28B:
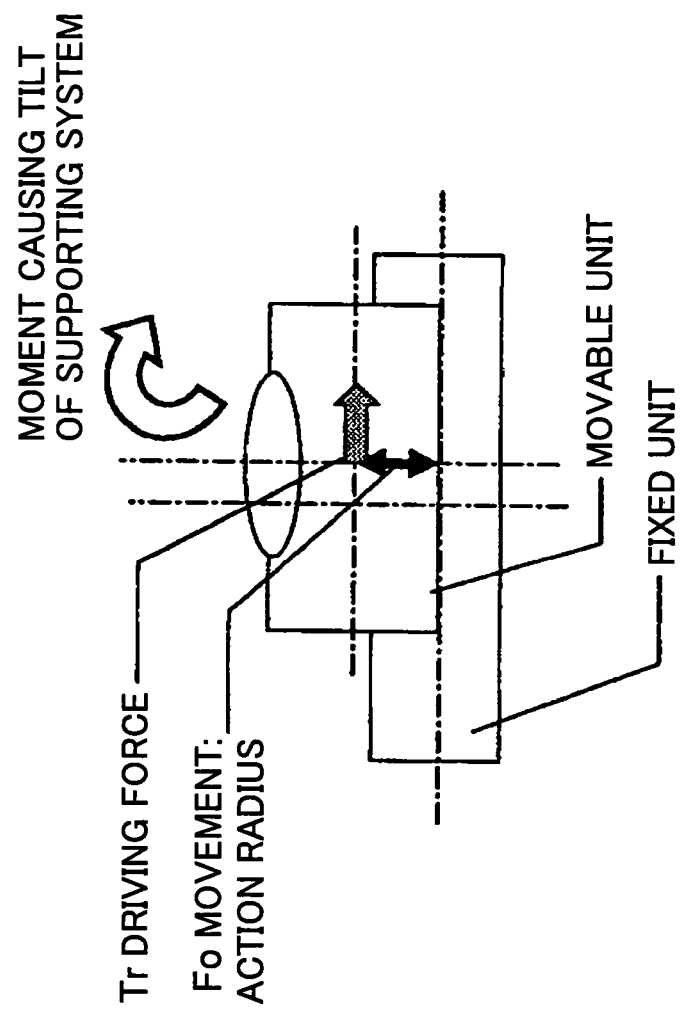
FIGS. 28A and 28B are views for showing the reason for the tilts arising in the supporting system in the object lens driving device shown in FIG. 25.
Figure 28A:
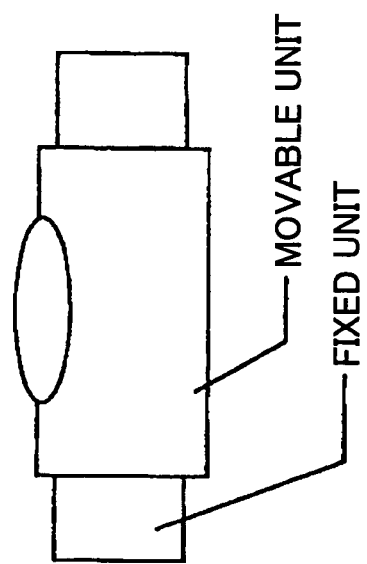

FIGS. 22A and 22B are a top view and a cross-sectional view schematically illustrating a configuration of an optical disk drive according to a seventh embodiment of the present invention, including the optical pickup in FIG. 21.

The optical disk drive illustrated in FIG. 22A and FIG. 22B includes a housing 51, vibration absorption rubber 52, a pickup module base 53, a spindle motor 54, and seek rails 55.

The pickup module base 53 is installed in the housing 51 with the vibration absorption rubber 52 in between. The spindle motor 54 is mounted on the pickup module base 53 to drive the recording medium 38 to rotate. The optical pickup 39 is attached to the seek rails 55 provided on the pickup module base 53.

The optical pickup 39 can move on the seek rails 55 along the radial direction of the recording medium 38.

In the present embodiment, the optical pickup 39 installed in the optical disk drive is the optical pickup illustrated in FIG. 21. As described above, such an optical pickup is capable of good servo control, so that it is possible to provide an optical disk drive able to record and reproduce data with high quality. As described above with respect to FIG. 21, the optical pickup 39 is mounted in an optical housing 42 and includes a laser 31, a collimator lens 32, a condensing lens 35, a cylindrical lens 36, a light reception element 37 an object lens 40, and an object lens driving device 41.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, it may be required that the total moment generated by the driving motors described in the second through fifth embodiments satisfy formula (1). Furthermore, it may be required that the total moment, including the sum of the moments generated by the driving motors described in the second through fifth embodiments, and the sum of the moments induced in manners other than those described in the first through fifth embodiments, satisfy formula (1).

According to the present invention, it is possible to provide an object lens driving device with a reduced tilt during focusing and tracking operations.

The present invention is applicable to a device for recording and reproducing data in a recording medium such as an optical disk of high density and large capacity.

This patent application is based on Japanese Priority Patent Application No. 2004-049923 filed on Feb. 25, 2004, the entire contents of which are hereby incorporated by reference.

What is claimed is:

1. An object lens driving device, comprising:
   a movable unit that includes an object lens and an object lens holding member for holding the object lens;
   a plurality of elastic supporting rods which rods are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and
   a driving unit that includes a focusing thrust force generation unit configured to generate a thrust force to displace the movable unit in the focusing direction and a tracking thrust force generation unit configured to generate a thrust force to displace the movable unit in the tracking direction;
   wherein a moment M approximately expressed by formula (1) is generated by the focusing thrust force generation unit and the tracking thrust force generation unit near axes perpendicular to the focusing direction and the tracking direction, respectively;

$$M = a * Xfo * Xtr * k\theta / (kfo * ktr) \quad (1)$$

where a is a coefficient, Xfo represents a magnitude of a focusing movement, Xtr represents a magnitude of a tracking movement, kθ represents a tilt spring constant, kfo represents a spring constant in the focusing direction, and ktr represents a spring constant in the tracking direction.

2. The object lens driving device as claimed in claim.1, wherein at a focusing position when each of the elastic supporting rods is not bent, a center of the driving coil in the focusing direction is substantially in agreement with a center of the driving magnet in the focusing direction.

3. The object lens driving device as claimed in claim 1, further comprising:
   a plurality of focusing thrust force generation units that are arranged in the tracking direction; and
   wherein an interval between centers of the driving coils of adjacent focusing thrust force generation units is less than an interval of centers of magnetic flux density distributions of the driving magnets respectively corresponding to the plurality of focusing thrust force generation units.

4. The object lens driving device as claimed in claim 1, further comprising:
   a plurality of focusing thrust force generation units that are arranged in the tracking direction; and
   wherein the moment is induced by differences of magnitudes of driving forces of the plurality of focusing thrust force generation units in the focusing direction occurring when the movable unit moves in the focusing direction and the tracking direction, said moment canceling out a tilt of the movable unit caused by a supporting system of the movable unit including the elastic supporting rods.

5. The object lens driving device as claimed in claim 1, further comprising:
   a plurality of tracking thrust force generation units that are arranged in the focusing direction; and
   wherein an interval between the centers of the driving coils of the adjacent tracking thrust force generation units is greater than an interval of centers of magnetic flux density distributions of the driving magnets respectively corresponding to the plurality of tracking thrust force generation units.

6. The object lens driving device as claimed in claim 1, further comprising:
   a plurality of tracking thrust force generation units that are arranged in the focusing direction; and
   wherein the moment is induced by differences of magnitudes of driving forces of the plurality of tracking thrust force generation units in the tracking direction occurring when the movable unit moves in the focusing direction and the tracking direction, said moment canceling out a tilt of the movable unit caused by a supporting system of the movable unit including the elastic supporting rods.

7. The object lens driving device as claimed in claim 1, wherein
   the driving magnet includes a double-pole magnet having a magnetization boundary in the tracking direction;
   the driving coil of the focusing thrust force generation unit includes a planar coil arranged across the magnetization boundary and facing the double-pole magnet; and
   the moment is induced by a difference of the magnitude of a driving force in the direction generated at a portion of the driving coil wherein a current flows in the focusing direction when the movable unit moves in the focusing direction and the tracking direction, said moment canceling out a tilt of the movable unit caused by a supporting system of the movable unit including the elastic supporting rods.

8. The object lens driving device as claimed in claim 1, wherein
   the driving coil of the tracking thrust force generation unit is arranged so that a magnetic flux penetrates, in the tangential direction, an effective portion of the driving coil wherein a current flows in the focusing direction; and
   the moment is induced by a change of the magnetic flux penetrating the effective portion of the driving coil when the movable unit moves in the tracking direction, said moment canceling out a tilt of the movable unit caused by a supporting system of the movable unit including the elastic supporting rods.

9. The object lens driving device as claimed in claim 1, wherein
   the driving coil of the tracking thrust force generation unit includes two substantially square coils;
   the driving coil of the tracking thrust force generation unit is arranged so that a magnetic flux in the tangential direction penetrates inner sides of the square coils, said inner sides being parallel to respective focusing directions;
   a length of a portion of the driving coil wherein a current flows in the tracking direction is set to be greater than a side of the driving coil parallel to the focusing direction;
   the driving coil of the tracking thrust force generation unit is arranged so that a magnetic flux in the tangential direction penetrates an effective portion of the driving coil wherein a current flows in the focusing direction; and the moment is induced by a thrust force in the focusing direction generated at a portion of the driving coil wherein a current flows in the tracking direction when the movable unit moves in the focusing direction and in the tracking direction, said moment canceling out a tilt of the movable unit caused by a supporting system of the movable unit including the elastic supporting rods.

10. An optical pickup, comprising:

a laser unit that emits a laser beam onto an optical disk;

a light-receiving optical system that receives light reflected from the optical disk;

and can object lens driving device;

wherein the object lens driving device includes a movable unit that includes an object lens and an object lens holding member for holding the object lens;

a plurality of elastic supporting rods which rods are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction;

wherein a moment M approximately expressed by formula (1) is generated by the focusing thrust force generation unit and the tracking thrust force generation unit near axes perpendicular to the focusing direction and the tracking direction, respectively $$M = a * X_{fo} * X_{tr} * k\theta / (k_{fo} * k_{tr}) \quad (1)$$

where a is a coefficient, Xfo represents a magnitude of a focusing movement, Xtr represents a magnitude of a tracking movement, kθ represents a tilt spring constant, kfo represents a spring constant in the focusing direction, and ktr represents a spring constant in the tracking direction.

11. An optical disk drive, comprising:

a rotational driving system that drives an optical disk to rotate; and an optical pickup that is provided to be able to move in a radial direction of the optical disk;

wherein the optical pickup includes a laser unit that emits a laser beam onto an optical disk;

a light-receiving optical system that receives light reflected from the optical disk; and an object lens driving device;

wherein the object lens driving device includes a movable unit that includes an object lens and an object lens holding member for holding the object lens;

a plurality of elastic supporting rods which rods are arranged on two sides of the movable unit in a tangential direction and support the movable unit while allowing the movable unit to move relative to a fixed unit in a focusing direction and a tracking direction, said focusing direction being in an optical axial direction of the object lens, said tracking direction being perpendicular to the focusing direction; and a driving unit that includes a focusing thrust force generation unit configured to generate a thrust force to displace the movable unit in the focusing direction and a tracking thrust force generation unit configured to generate a thrust force to displace the movable unit in the tracking direction;

wherein a moment M approximately expressed by formula (1) is generated by the focusing thrust force generation unit and the tracking thrust force generation unit near axes perpendicular to the focusing direction and the tracking direction, respectively $$M = a * X_{fo} * X_{tr} * k\theta / (k_{fo} * k_{tr}) \quad (1)$$

where a is a coefficient, Xfo represents a magnitude of a focusing movement, Xtr represents a magnitude of a tracking movement, k θ represents a tilt spring constant, kfo represents a spring constant in the focusing direction, and ktr represents a spring constant in the tracking direction.

* * * * *